INVENTOR.
Jaroslav Hrabak
BY
Michael S. Striker
Attorney

INVENTOR.
Jaroslav Hrabak
BY
Michael S. Striker
attorney

INVENTOR.
Jaroslav Hrabak
BY
Michael S. Striker
Attorney

STATISTICAL QUALITY-CONTROL METHOD AND APPARATUS

Filed Aug. 11, 1958

INVENTOR.
Jaroslav Hrabak
BY
Michael S. Striker
Attorney

INVENTOR.
Jaroslav Hrabak
BY
Richardson & Anker
Attorneys

INVENTOR.
Jaroslav Hrabak
BY

INVENTOR.
Jaroslav Hrabak
BY
Michael S. Striker
Attorney

United States Patent Office 3,151,237

Patented Sept. 29, 1964

3,151,237

STATISTICAL QUALITY-CONTROL METHOD AND APPARATUS

Jaroslav Hrabak, 3 Osadni, Prague VII, Czechoslovakia

Filed Aug. 11, 1958, Ser. No. 754,499
Claims priority, application Czechoslovakia, Dec. 21, 1957, 4,963/57; June 20, 1958, 3,289/58
2 Claims. (Cl. 235—151)

The present invention relates to a statistical quality-control system and more particularly to such a control system, which aims at determining the statistical distribution of certain qualtiy characteristics.

The employment of statistical methods for the control of production processes is of utmost importance in those instances where the controlled quality (the so-called quality characteristic such as size, weight, composition of materials etc.) shows a statistical character of distribution, i.e., is accompanied by incidental deviations and can be represented by a distribution curve similar to the Gaussian probability curve. This condition applies to the majority of production processes.

In carrying out this statistical control, several quality characteristics such as dimensions, weights, volume, intensity of radiation or, if necessary, also other properties may be handled simultaneously, but in the present disclosure of the invention the control of only one quality characteristic will be discussed by way of example, it being however understood that by a suitable combination of a plurality of systems a simultaneous control of a plurality of quality characteristics may be carried out analogously.

The employment of methods of mathematical statistics in production is well known in the art and has already yielded remarkable results besides entailing a considerable reduction of production costs. The statistical methods of production quality control permit the achievement of almost any required accuracy of production processes by using statistical control factors which characterize the position and/or dispersion shown by the statistical distribution curve of the appropriate quality characteristics. These control factors (also called sample or statistical characteristics) are subject to random variations and are obtained by computation from the results of measurements on a series of samples by using the methods of mathematical statistics. By comparing a sample characteristic with the corresponding specified or desired value or dimension it is possible to ascertain whether a discovered difference is statistically significant or not. If the difference (from the statistical point of view) is significant, provisions must be made for correcting the situation so that the quality characteristic of further samples regains equality with the value or dimension desired or specified for the particular article of production.

It is however a disadvantage of the aforesaid method that the computation is highly complex and tedious, and requires highly skilled scientific workers.

Automatic statistical quality control systems (e.g., according to U.S. Patent Nos. 2,688,459, 2,688,740 and 2,767,914) have been lately developed to carry out the control statistically by means of computing machinery. The hitherto known systems, however, employ as control factors sample characteristics conventionally used in the statistic art, namely the average value $\overline{X}$ and the range R or similar known statistical characteristics. These characteristics have first to be calculated in an apparatus on the basis of the measurements taken and only then they can be compared with the limits specified for the particular product. The result of this comparison is processed by the statistical machine to produce inpulses which either give to the operator suitable signals in order that he may adjust the production process or which, in the case of automatic control of the production process, effect the necessary adjustments on the production machine.

If, for instance, the mean value $\overline{X}$ is used as the operative sample characteristic it is necessary to measure or check a selected number of articles, a so-called sampling of the size $n$, which measurements the apparatus has first to add together and then to divide by the number $n$. It is obvious that this process requires a complex mathematical machine. The use of other characteristics usually employed in statistics requires at least equally or even more complex machines.

It is therefore the main object of the present invention to obviate the aforesaid drawbacks and to simplify substantially the employment of the known statistical methods by using other unconventional sample characteristics which are more suitable for the solution of the given problem.

With above objects in view, the present invention is based in principle on the employment of a statistic evaluation apparatus, which operates with sample characteristics according to the so-called grouping method. The grouping method (Stevens: "Control by Gauging," T. Roy. Stat. Soc., London) consists in that a sampling of $n$ measurements is classified, according to the result of measuring them in reference to certain limiting values applying to the quality characteristic under consideration, into several groups, the number of articles or measurements in any group being used to compute appropriate statistical characteristics. Thus in the case of two statistically predetermined modified production capability limits called for the sake of brevity "MPC limits" (which case will be exclusively treated in this description), three groups or categories of articles or measurements are obtained, namely:

(*a*) The so-called "good" group of measurements, with measured values contained within the MPC range limited by the said two MPC limits, the number of articles or measurements in this group to be denoted by $g$;

(*b*) The "plus" or "excess" group of measurements, where the measured values exceed the upper MPC limit, the number of measurements in this group to be denoted by $z_+$ and (*c*) The "minus" or "deficient" group of measurements, the values of which lie below the lower MPC limit and the number whereof are to be denoted by $z_-$.

Of course, it should be noted that in some special cases it may be preferable, by determining more than two MPC limits, to use more than three groups, but the number should in no instance be more than six.

From the number of articles or measurements in the various groups the character of the statistical distribution may be ascertained. For example, if the mean value of the distribution (the distribution curve) is shifted in the direction toward the higher values, the number $z_+$ increases and the number $z_-$ decreases; the flattening of the distribution curve due to increased dispersion results in an increase of both numbers $z_+$ and $z_-$ and concurrently in a decrease of the number $g$, etc. Of particular advantage in connection with the present invention is the use of statistical sample characteristics defined by the sum $S=z_++z_-$ and by the difference $r=z_+-z_-$, as will be explained hereinafter, but other suitable characteristics may be obtained by simple calculating operations from the numbers $z_-$, $z_+$ and $g$.

The objects and advantages of the present invention will appear more clearly from the ensuing disclosure with reference to the accompanying drawings, which represent by way of example several embodiments of the invention and in which the same reference characters are used to denote the corresponding parts having the same function while the novel features of the invention are set forth in the appended claims: In the drawings:

FIG. 1 shows the block diagram of a hand-operated statistical control system;

FIG. 1*a* is a graph in rectangular coordinates showing a normal distribution of measurements and its division into the three groups;

Figure 4:
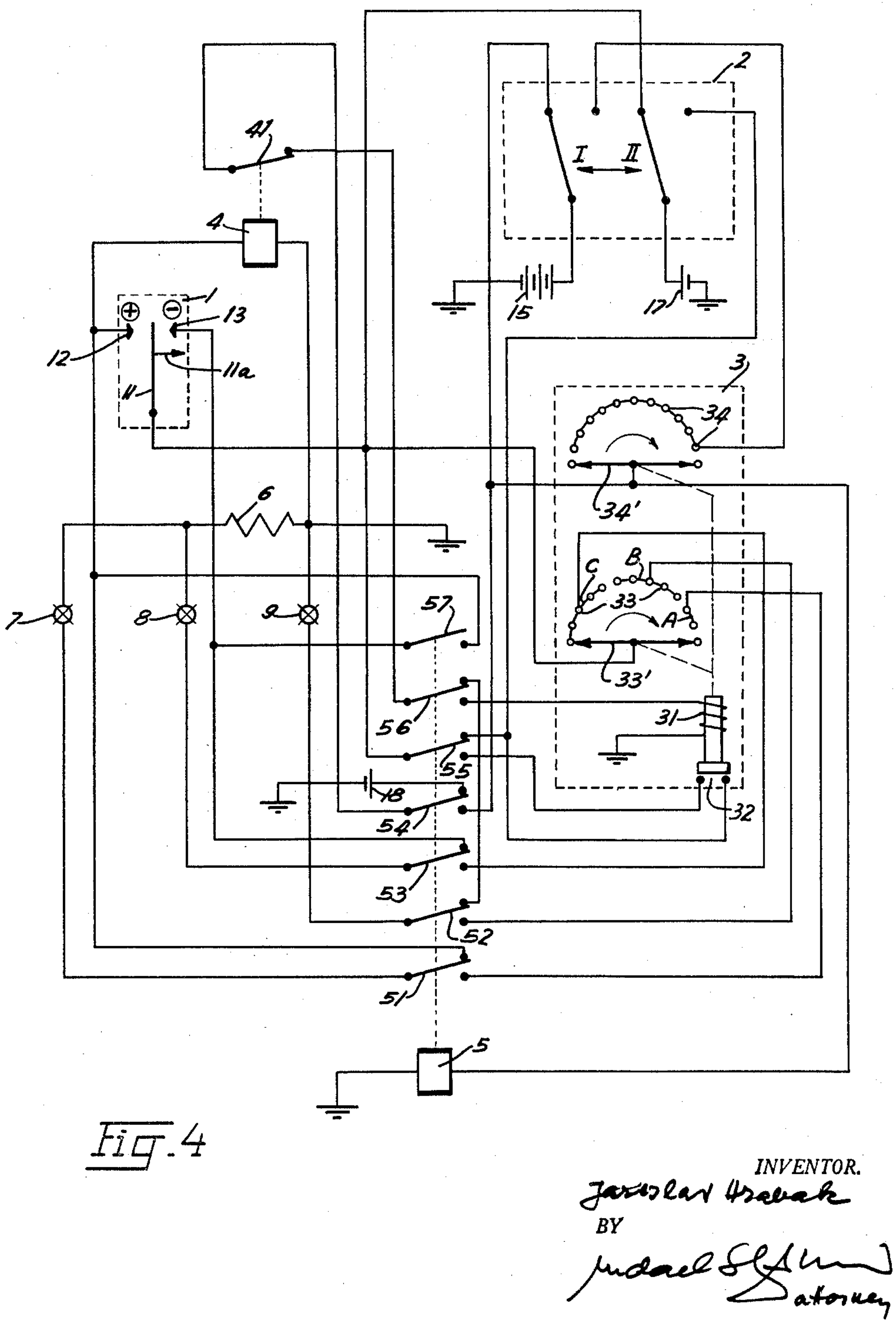
Figure 5:
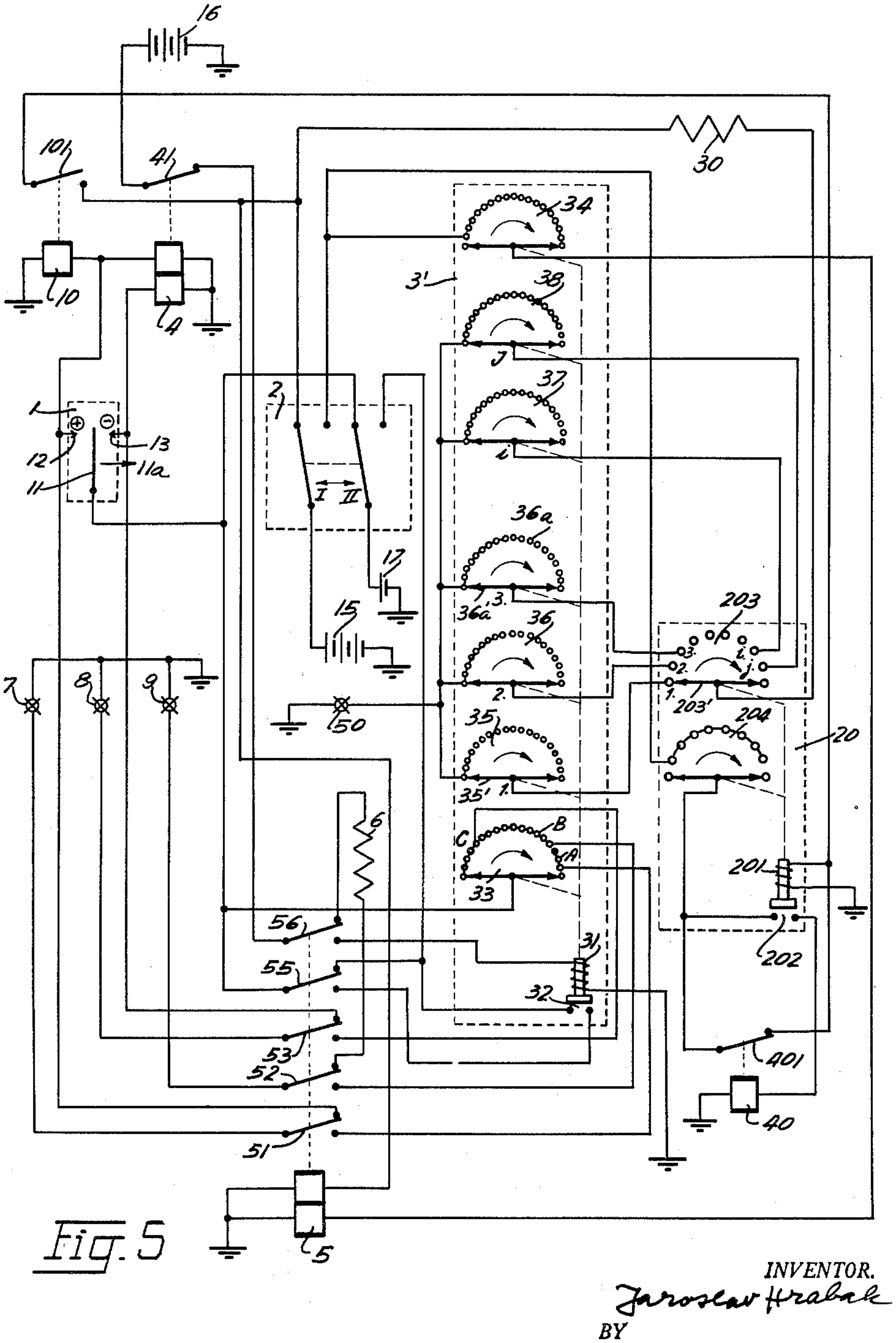
Figure 6:
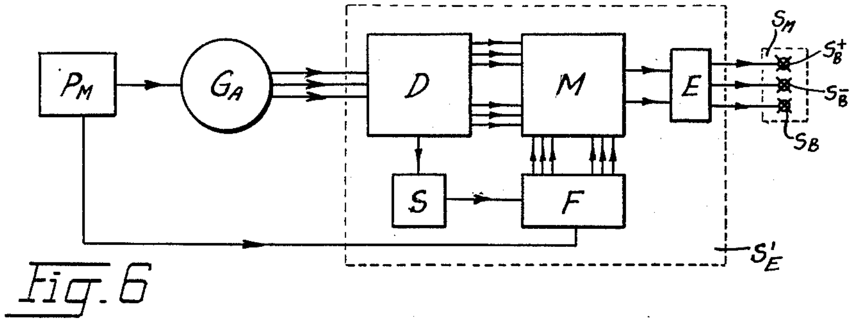
Figures 7, 7A:
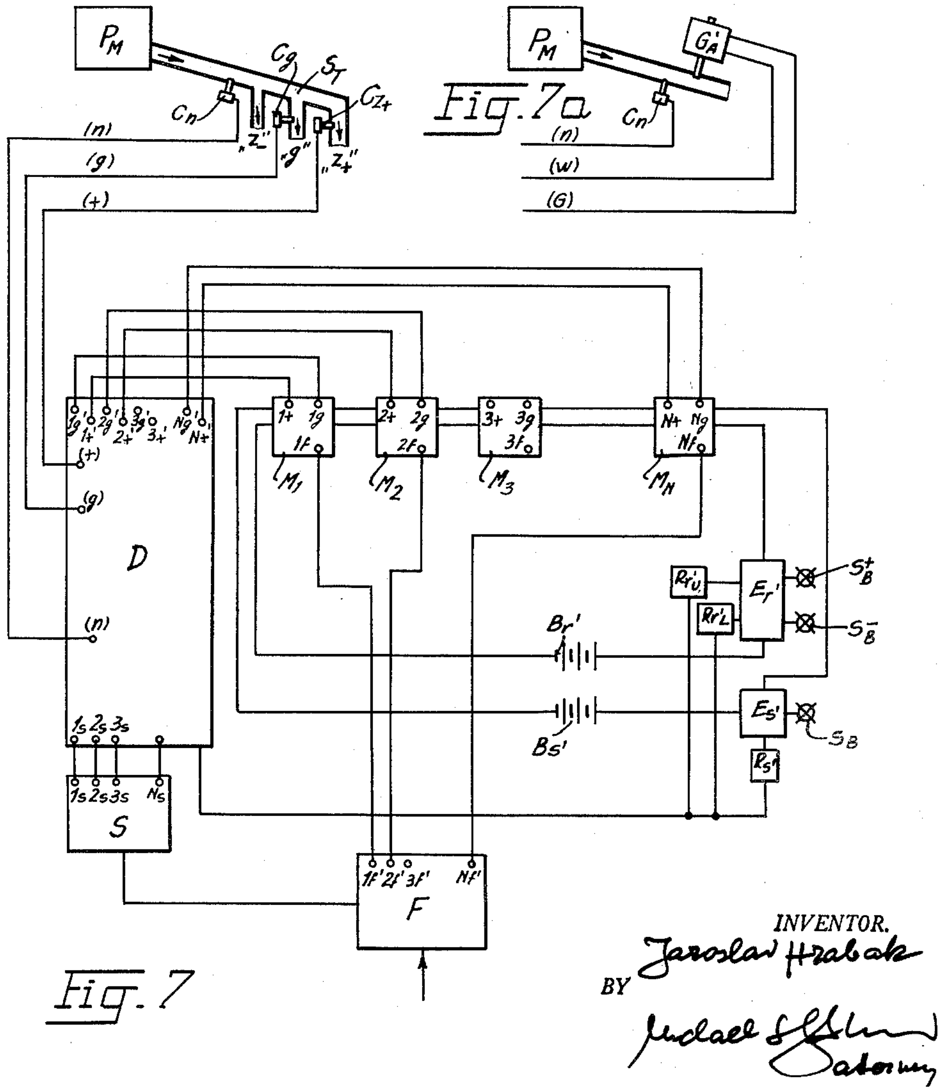
Figure 8:
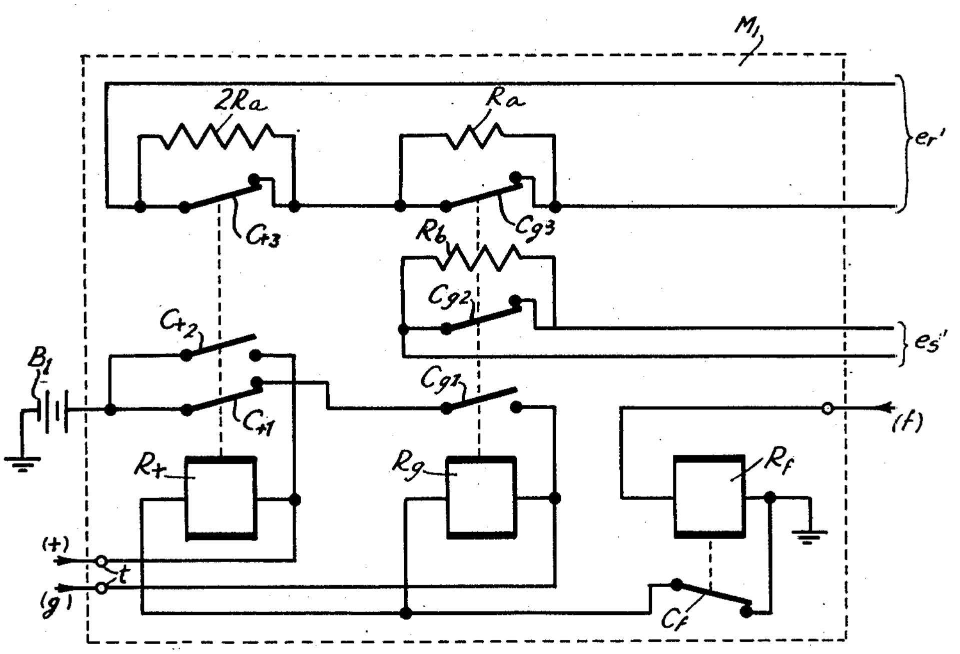
Figure 10:
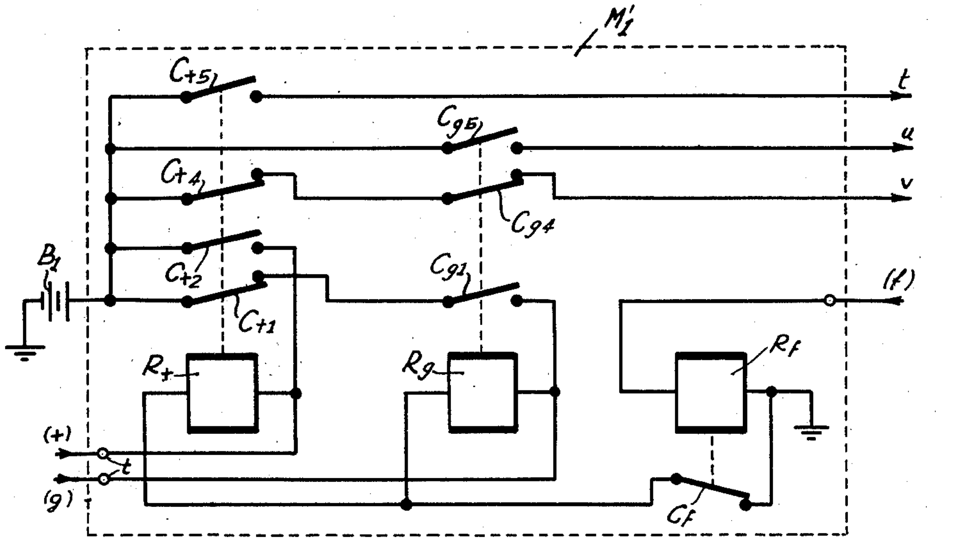
Figure 9:
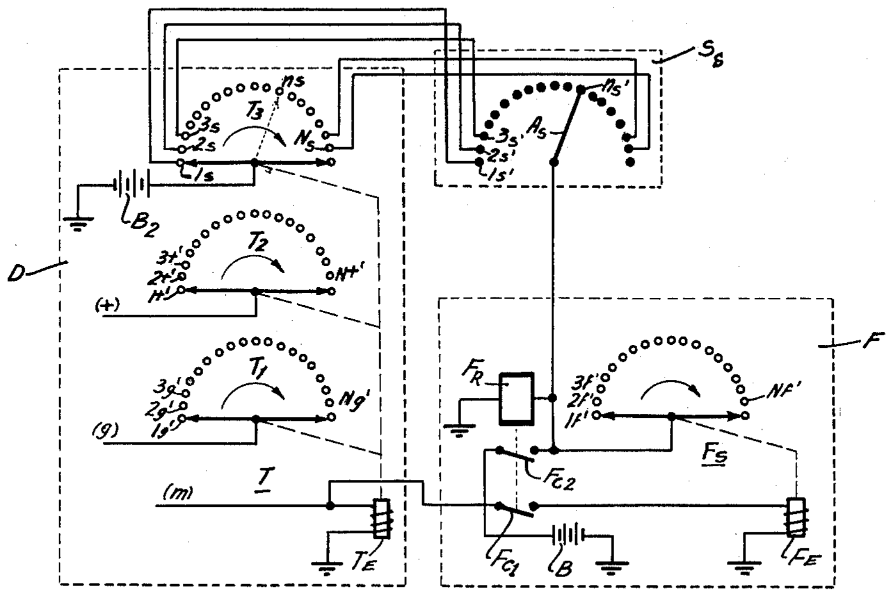
Figure 11:
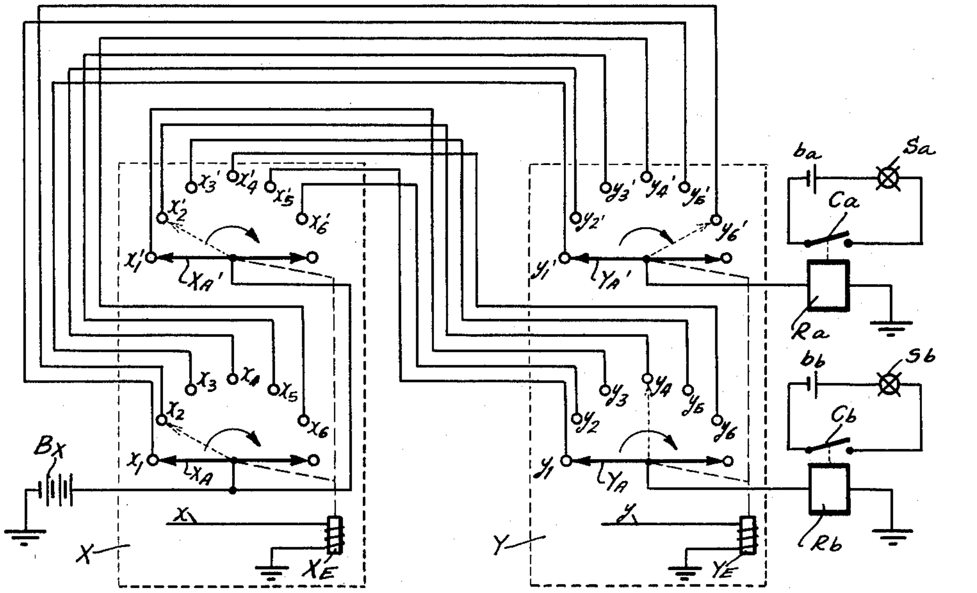
Figure 12:
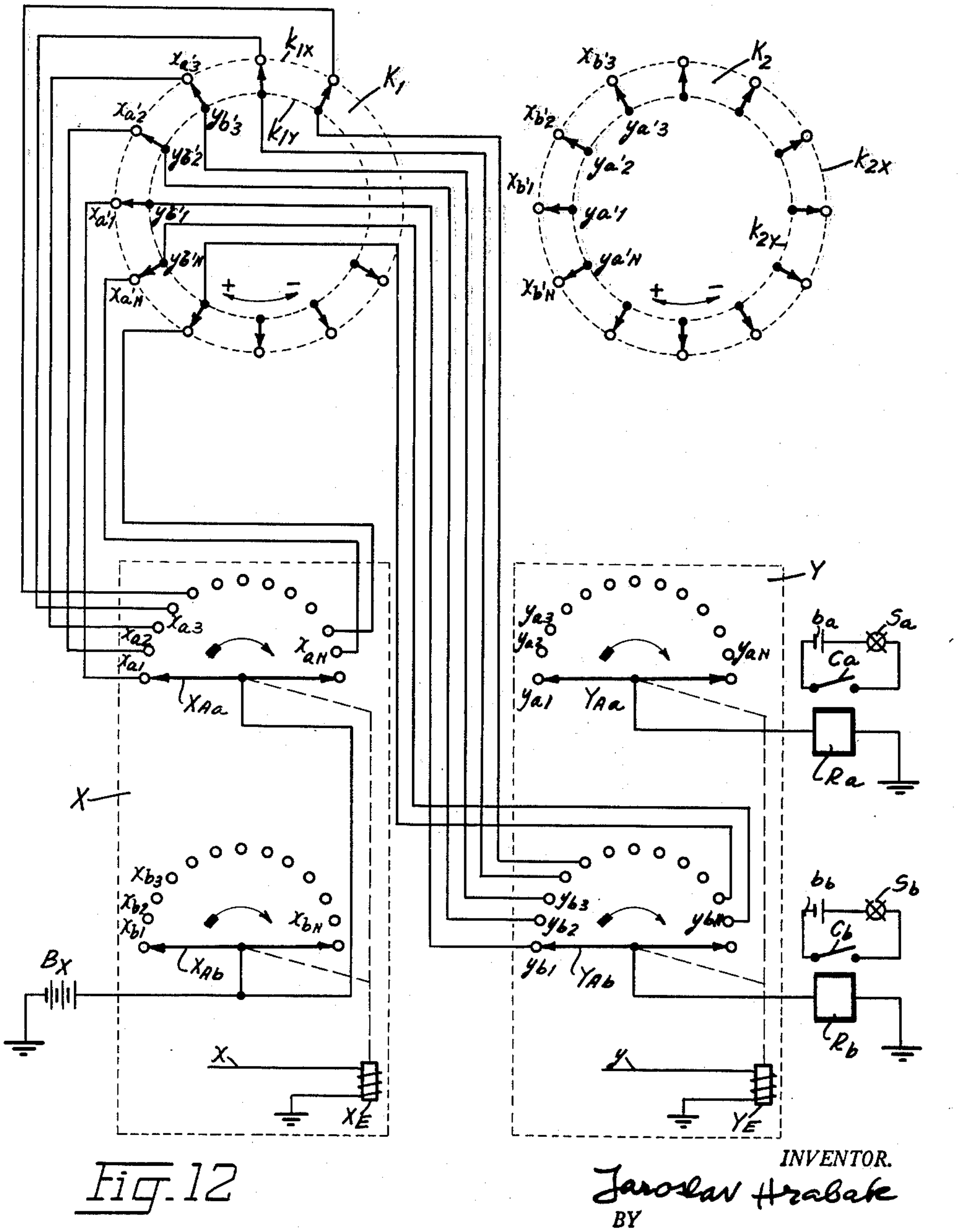

FIGS. 4 and 5 are schematic diagrams illustrating statistical dimension control systems using as a measuring means a known gauging device which indicates three predetermined ranges by emitting different signals, when measuring the dimension of each range. In the embodiment according to FIG. 4 only the change in the position of the mean of the distribution curve is ascertained, whereas in the embodiment of FIG. 5 changes both in the position of the mean and in the dispersion of the distribution curve are indicated;

FIG. 6 is a block diagram illustrating the statistical quality control system based on moving statistical characteristics;

FIG. 7 is a more detailed block diagram of the statistical quality-control system based on moving statistical characteristics;

FIG. 7*a* shows an alternative measuring means for the system in FIG. 7;

FIG. 8 shows a detail diagram of one memory unit used in the system of FIG. 7;

FIG. 9 is a diagram showing the distributing and canceling units of the system of FIG. 7;

FIG. 10 illustrates diagrammatically the memory unit of FIG. 8 in an alternative form;

FIG. 11 is a schematic diagram of a comparing unit, in which the sample characteristics are compared with fixed control limits; and FIG. 12 shows in diagrammatic form an alternative of the comparing unit, in which the control limits can be adjusted.

Figure 1:
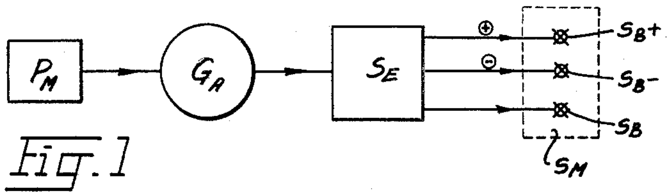

FIG. 1 shows in diagrammatic form as an introduction into the subject matter a statistical evaluating system illustrating the state of art such as can be used in conjunction with any known method. The machine $P_M$ producing the articles characterized by the examined or measured quality characteristic (hereinafter referred to as "source of quality characteristic" or abridged only "source") may in this example be a centerless grinding machine, to which a suitable gauging apparatus $G_A$, e.g., an electromechanical gauge is operatively connected. This known device transmits information about the quality characteristic under consideration to a statistical evaluating apparatus $S_E$, provided with signaling means $S_M$. FIG. 1 shows a signaling device with three channels, the signaling means comprising for example bulbs of different colors. The signaling means $S_B$ transmits information about achieved accuracy; the signaling means $S_B^+$ and $S_B^-$ furnish information as to how to correct or readjust the source $P_M$ (e.g., a machine tool) for reestablishing the desired accuracy. The lighting of the signaling means $S_B^-$ (e.g., a red bulb) signifies that the value of the quality characteristic (e.g., dimension) has to be increased and the lighting of the signaling means $S_B^+$ (e.g., a green bulb) that the quality characteristic produced in the machine $P_M$ has to be reduced. The control itself, i.e., the adjustment of the machine $P_M$ may be carried out according to such light signals even by an unskilled operator with the result that a high accuracy of production may be achieved.

As mentioned before, the sample characteristics may be chosen from a variety thereof currently used in mathematical statistics, such as the average value $\overline{X}$, the mean quadratic (standard) deviation $\sigma$, ect. The use of the grouping method as disclosed herebelow entails considerable advantages, said method consisting substantially in estimating the change (shift) in the position of the mean (crest of the curve) of the distribution of the measurable characteristic, on the basis of the difference $$r = z_+ - z_- \quad (1)$$

and the change in dispersion on the basis of the sum $$S = z_+ + z_- \quad (2)$$

Figure 1A:
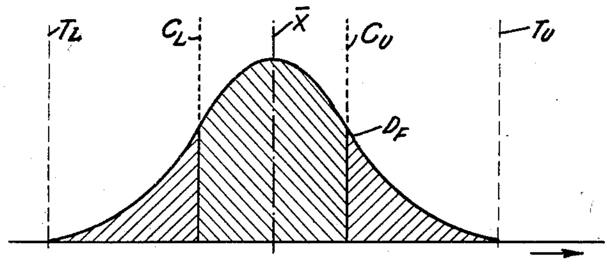

In both formulas:

$z_+$ . . . denotes the number of measurements in which the value of the quality characteristic exceeds the upper MPC limit $C_U$, $z_-$ . . . denotes the number of measurements in which the value of the quality characteristic lies below the lower MPC limit $C_L$. For better understanding of this principle the distribution curve $D_F$ of the quality characteristic is drawn in FIG. 1*a*. In this diagram the abscissa is represented by the value of the quality characteristic, whereas the ordinate signifies the relative frequency. It is obvious that since no article should have its dimension outside the tolerance range, the whole distribution curve $D_F$ is considered to lie between the lower tolerance limit $T_L$ and the upper tolerance limit $T_U$. The MPC limits $C_L$ (lower MPC limit) and $C_U$ (upper MPC limit) divide the area under the curve $D_F$ in three parts as has been already mentioned.

The MPC limits $C_L$ and $C_U$ are determined by the statistical control plan and depend upon the working process under consideration.

The statistical control plan establishes the sampling size *n* and the root-mean-square or standard deviation of the quality characteristic under consideration. This standard deviation is computed from an analysis of the precision of the production process and is used to ascertain the said MPC limit range. Further the statistical control plan indicates the so-called statistical control limits $R_S$, $R_{rU}$, $R_{rL}$, which determine the allowable variation of the statistical characteristics S and T. Thus the statistical control limit for the sum S may be denoted by $R_S$. The statistical characteristic S is an indication of the accuracy of production, because an increased dispersion of $D_F$ denotes increasing inaccuracy of the machining process. This sum S is compared in the statistical evaluator $S_E$ with its control limit $R_S$. If the sum S is greater than $R_S$, an electric voltage is applied to the signaling bulb $S_B$ and the machine $P_M$ has to be stopped and the accuracy of production has to be increased.

For the statistical characteristic *r*—the difference according to Formula 2—two statistical control limits $R_{rL}$ and $R_{rU}$ have to be set. The lower limit $R_{rL}$ has in this case a negative value and if the difference *r* is less (that is if it has a greater negative value than $R_{rL}$), the signaling means $S_B^-$ (e.g., the red light) is made to operate. On the other hand, the signaling means $S_B^+$ (e.g., the green lamp) is only actuated, if the difference *r* is greater than the upper control limit $R_{rU}$, which in this case is a positive number.

Figure 2:
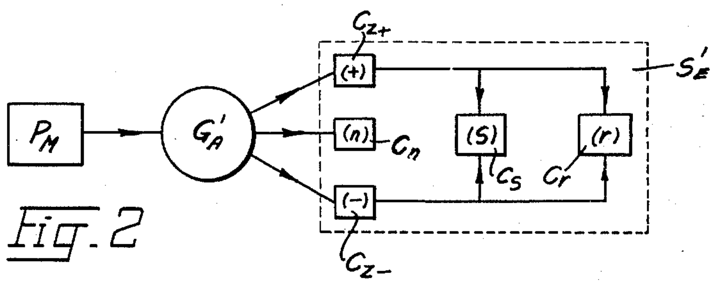
FIG. 2 is the block diagram of a simple statistical evaluating apparatus based on the principle of the grouping method.

FIG. 2 shows diagrammatically a simple embodiment of a statistical evaluating apparatus according to the present invention and based on the principle of the grouping method. The apparatus comprises substantially the following units:

Unit $C_n$, which counts all measurements and signals the completion of the sampling of *n* component parts, Unit $C_{z+}$, which counts the $z_+$ measurements above the upper MPC limit $C_U$, Unit $C_{z-}$, which counts the $z_-$ measurements below the lower MPC limit $C_L$, Unit $C_S$, comprising a simple adding device, which determines the sum S according to Equation 2 and Unit $C_r$, which ascertains the difference *r* in accordance with Equation 1.

The two units $C_S$ and $C_r$ are connected to a suitable signaling apparatus (not shown in FIG. 2), in which by comparison of the obtained values of *r* and S [illegible] tial deviation of [illegible]

When for example the admissible value of $R_S$ is exceeded, this indicates a substantial change in the dispersion and establishes the necessity of increasing the accuracy of the production process. When the admissible value $R_{rU}$ (or $R_{rL}$) is exceeded in the direction "plus" (or "minus"), then this indicates a substantial change in the mean of the distribution and therefore calls for a substantial alteration in the setting of the machine toward the greater (or smaller) values of the quality characteristic.

The sums and differences, respectively, in the individual units $C_S$ and $C_r$, may be established in various ways (e.g., by electrical computing means on the basis of capacity, ohmic or inductive resistance, etc.). The most suitable types of units $C_n$, $C_{z+}$, $C_{z-}$, $C_S$ and $C_r$ are: electromagnetic stepping switches (telephone selection switches) and telephone relays operated by direct current. The first unit $C_n$ is intended for determining the number of the measured articles, the second unit $C_{z+}$ adds the number of measurements above the upper MPC limit $C_U$, the third unit $C_{z-}$ adds the number of measurements below the lower MPC limit $C_L$, the fourth unit $C_S$ adds the values (information) furnished by the second and third units $C_{z+}$ and $C_{z-}$, respectively, and the fifth unit $C_r$ produces the difference of values respectively indicated by the units $C_{z+}$ and $C_{z-}$. The cancellation of the indicated values is effected by means of suitably connected contacts of the stepping switches, by circuit breakers and telephone relays in similar manner as will be disclosed in embodiments described later. The number $n$ (sampling size) of the measurements to be treated as well as the limiting values for $C_L$, $C_U$, $C_S$, $C_{rL}$ and $C_{rU}$ may be adjusted in the just described apparatus by means of adjusting switches arranged on a switchboard.

Figure 3:
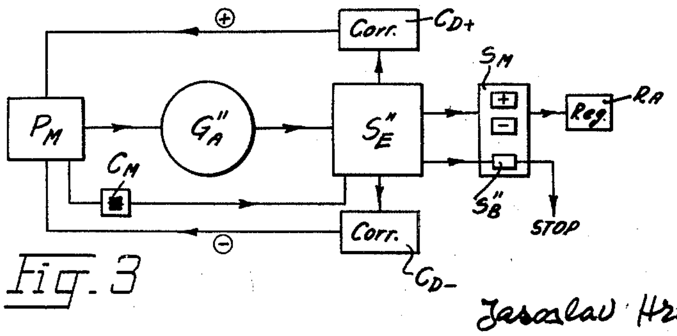
FIG. 3 illustrates diagrammatically the principle of an automatic statistical evaluation system.

FIG. 3 shows a diagram of an automatic statistical evaluating apparatus which represents a logical further development of the devices shown in FIGS 1 and 2. The source $P_M$ of the quality characteristics may in this instance be, for example, a rolling mill for producing sheet iron and the measuring apparatus $G_A''$ may be an electrical instrument for continuously measuring the sheet thickness. The statistical evaluating apparatus $S_E''$ is provided with an accumulator (memory unit) for the suitable statistical characteristic (e.g., $r$ and S), and cooperates with further "corrector" devices $C_{D+}$ and $C_{D-}$, which control automatically the source $P_M$ in such a way, that the apparatus $C_{D+}$ causes, whenever required, an increase and the apparatus $C_{D-}$ a decrease of the measured value, in this instance the thickness of the rolled sheet.

In FIG. 3 also a sisgnaling transmitter $S_M$ is shown which is connected to the unit $S_E''$, but this device is not necessary if automatic control by the devices $C_{D+}$ and $C_{D-}$ is employed. In this instance provision can be made to effect the stopping of the machining process in case of a signal given by the member $S_B''$ as shown by the "stop" arrow.

It is, however, highly advantageous to provide a registering apparatus $R_A$. This apparatus may supply not only information about the variations of the measured value (the quality characteristic or characteristics) and/or of the corresponding sample characteristics, but also can give evidence of the operation of the control device, i.e., shows on a registering chart whenever controls had to be applied to the production process. The apparatus may further be provided with means $C_M$ canceling the signal or other indications hitherto furnished by $S_E''$ or $S_M$ upon resetting the machine.

The cancellation of the information upon resetting the machine is necessary in particular if the sampling of $n$ measurements is carried out currently, i.e., if always the last $n$ measurements serve for the evaluation of the sample characteristics (e.g., $r$ and S), because in this way the measurements carried out prior to the resetting of the machine will be prevented from exerting any influence on the control after the resetting.

The disclosed apparatus in FIG. 2 requires three circuits for determining the difference $r$. Required is a counting device $C_{z+}$ which for a given number of measurements that is for the sampling number $n$ determines the number $z_+$, a second counting device $C_{z-}$ for the number $z_-$ and finally a third device $C_r$ which calculates the difference $r=z_+-z_-$.

According to a further feature of the present invention a simplification may be achieved when the indications of a known, conventional feeler type measuring apparatus are used, which includes a switch and signalizes the magnitude of the quality characteristic (e.g., the diameter of articles produced on a centerless grinding machine) in relation to a tolerance range, designating the articles within this range as "good" and the articles outside the tolerance limits as "outside plus" or "outside minus."

In a device of this known type the electrical gauge may, e.g., be designed so as to cause a white signal-light to be lit when the article is within tolerance limits. However, under the influence of a spring biasing the feeler and switch arm of the gauging device permanently toward its lower extreme position, a signal is also produced if no article is present in the measuring apparatus, said signal corresponding to that indicating a dimension below the lower tolerance limit, i.e., a red signaling bulb lights up. Dimensions above the upper tolerance limit are indicated by a green signal light.

During passage of an article through the gauging track three possibilities may occur:

(a) The article is below the lower tolerance limit: a red signal light shows.
(b) The article is within the tolerance limits: the signals red-white-red appear in succession.
(c) The article is above the upper tolerance limit: the signals red-white-green-white-red appear in succession.

According to the invention a similar, or the above described, principle of measurement is employed for the statistical control of a quality characteristic. This simplifies substantially the statistical evaluating apparatus it being then sufficient to provide a single adding device. When adopting this known gauging apparatus as a measuring device for the statistical control, its limit values are adjusted to the already explained modified production capability (MPC) limits instead of to the tolerance limits. It has been found in practice that it is preferable to set the MPC limits above and below the arithmetic mean value by the amount of the standard deviation; i.e., the MPC range includes approximately one third of the tolerance range. Throughout the present specification the expressions "outside minus" and "outside plus" will be related to the MPC limits which are given by statistical considerations and not to the tolerance limits used in connection with the conventional feeler type measuring apparatus.

According to one feature of the invention, instead of the difference $r$ (from Equation No. 1) for indicating the shift of the mean value of the distribution curve, a sum of certain electrical impulses furnished by the gauging device 1, adjusted as previously described, may be utilized. Suitable sample characteristics may comprise the sum of the electrical impulses which are determined by the intermediate position of the arm of the gauging device and which as explained above would be indicated by said device by signalling a white light. These impulses will be hereinafter referred to as "intermediate position" impulses or "white light" impulses and will be denoted by the letter W. The "red light" or "lower contact" impulses are provided by the gauging device in case there is no article present under the measuring pin or an "outside minus" article is present, in which case the arm 11 of said device engages the lower contact and produces a red signal in the manner explained. The number of these impulses will be denoted by R. The "green light" or "upper contact" impulses are provided by the gauging device only in case an "outside plus" article is passed. The "green light" impulses are determined by a short engagement of the arm 11 of the gauging device with the upper contact and by a flashing of the green signal. The number of these impulses is denoted by the letter G. The number of electrical impulses, whether "lower contact" R, "intermediate position" W, or "upper contact" G, are provided during the passage of the sampling number $n$ of articles along the gauging track.

The proof of the correctness of this statement follows from the ensuing consideration in which the following designations are used:

R . . . the number of red light impulses in the sampling number $n$.

G . . . the number of green light impulses in the sampling number $n$.

W . . . the number of white light impulses in the sampling number $n$.

The number of "outside plus" articles (that is above the upper MPC limit $C_U$) is expressed directly by $$z_+=G \quad (3)$$

The number of "good" production items $g$ is determined by the relation $$g=W-2G \quad (4)$$

and the number of production items below the lower MPC limit $C_L$ follows from the equation (explained further below):

$$z_-=n+1-R \quad (5)$$

The number of measured component parts, the so-called sampling size, is given evidently by the expression $$n=z_++g+z_- \quad (6)$$

From the Equations 1, 3 and 5 follows the relation $$r=z_+-z_-=R+G-(n+1)=r_1-(n+1) \quad (7)$$

it being further possible to derive from the Equations 1, 3, 4, 5 and 6 the expression $$r=z_+-z_-=W-n=r_2-n \quad (8)$$

It follows from the Equations 7 and 8, that because of the value $n$ being constant, it is possible to use instead of the sample characteristic $r_1$, i.e., the difference according to (1), either the characteristic $r_1=R+G$ or the characteristic $r_2=W$.

The Equation 3 is obvious. Every "outside plus" article being measured must cause the green bulb to light up once.

The Equation 4 follows from this consideration: Each "good" article causes the white bulb to light up once. Each "plus" article lights the green bulb once and the white bulb twice. Therefore the white bulb is alight as many times as there are "good" articles and twice as many times as there are "plus" articles. Thus, Equation 3 makes Equation 4 evident.

Similarly as Equation 3 and 4 the Equation 5 follows from logical consideration. If all $n$ articles were "minus," the red bulb would be alight during the whole sampling process; that is, continuously. Each article with a quality characteristic higher than the lower MPC limit $C_L$ (the number of these component parts is given by the number $n-z_-$) causes one interruption of the red light. It can therefore be maintained that the number of red impulses is given by the following relation:

$$R=1+(n-z_-)$$

The Equation 5 follows from this relation.

For the purpose of illustrating the application of above principle, a wiring diagram of a statistical control apparatus according to the invention is shown in FIG. 4 of the accompanying drawing.

The apparatus comprises the following main parts: an electrical gauging device 1 of a conventional design with fixed contacts 12 and 13 and a switch arm 11 biased by a spring or the like acting in direction of arrow 11*a* toward contact 13 and thereby normally in contact therewith, a two-pole double-throw switch 2, a telephone stepping switch with an electromagnet 31, an auxiliary contact 32, a contact-set 33 (divided into sections A, B and C) and a contact set 34 (all contacts except the first connected in series, a polarized relay 4 with breaker contact arm 41, a relay 5 with switch arms 51, 52, 53, 54, 55, 56, 57, a resistance 6 and signal lamps 7, 8, 9. A suitable gauging device 1 may comprise, for example, the Sigma Patent Electric Signal Gauge available from Alfred Herbert Ltd., of Coventry, England, and described in the literature of Alfred Herbert Ltd.

The apparatus can operate in two different ways:

The stepping switch 3 of FIG. 4 is used to count electrical impulses called the "white light" impulses W. A white light impulse is furnished by the gauging head 1 whenever the arm 11 assumes an intermediate position not touching either contact 12 or 13. The position of the switch arm 33' of the contact set 33 indicates the number of these electrical impulses recorded. There is a difference between the "green condition" and the "green impulse" as used throughout the specification. If an article corresponds to the "green condition" and such article is passed through the gauging track, there are several impulses emitted by the gauging head 1. The "green condition" therefore corresponds, in the position II of the switch 2 of FIG. 4, to two "white" impulses. These two "white" impulses (or the arm 11 twice being in the intermediate position during the passing of the article under the gauging track) induce the counter 3 to make two steps in case the switch 2 is in its position I. Thus, for each "minus" article the stepping switch does not step forward; for each "good" article the stepping switch steps forward one step; and for each "plus" article the stepping switch steps forward two steps.

In the position I (as shown) of the switch 2 the apparatus operates according to the invention as a counter of electrical impulses produced by the gauging device 1. Thus, in the case of "white" impulses W, i.e., the apparatus counts how often the arm 11 which moves together with a feeler of the gauging device 1 asumes the position between the contacts 13 and 12 during the passage of $n$ articles. After $n$ articles have passed below the feeler of the gauging device 1, the signal lamps 7, 8, 9 indicate, whether the characteristic $r_2=W$ (which has a fixed relation to the difference $r$) lies above a predetermined upper or below a lower statistical control limit value or whether this characteristic W lies within the range between the two control limits, making a resetting of the machine superfluous.

If the switch 2 is thrown over to the position II, the aforesaid (in the position I) accumulated information, as will be explained below, is cancelled and the appartus operates as a conventional signal transmitter for the electrical gauging device 1, i.e., the momentary position of the arm 11 with respect to the contacts 12 and 13 is indicated. The signal lamps (7 green, 8 red and 9 white) then show whether the just passing article is "plus" (i.e., quality characteristic is above the upper MPC limit) or whether the article is "minus" (i.e., below the lower MPC limit) or "good" (i.e., the quality characteristic lies within the range of the two MPC limits) similarly to the operation of the conventional gauging apparatus as dscribed above.

In the position I of the switch the light signal is given by the signal lamps indicating the momentary position of the arm of the telephone switch type contact-set 33. The signal lamps 7, 8, 9 show which section A, B or C of the series of contacts 33 is in engagement with the associated contact arm 33'. Thus, for instance, the flashing of the green bulb 7 indicates that a considerable change in the position of the mean value of the respective quality characteristic in the direction "plus" has taken place, the flashing of the red bulb 8 denotes a tendency toward the formation of "minus" and the white light of the bulb 9 means that a resetting of the production machine is in order. The decisive information, however, is signaled only after the passage of the whole sampling selection "$n$" and the respective signal lamp remains alight until extinguished by switching over the switch 2 to position II.

The position II of the switch 2 serves also for setting the apparatus to the MPC limits. These MPC limits $C_L$, $C_U$, as mentioned before have to be chosen according to a statistical control plan so as to be spaced apart much less than the tolerance limits $T_L$, $T_U$ used with the conventional gauging instruments (see FIG. 1). It has been proved, for instance, that while the ordinary tolerance range has to correspond to the width of the whole range of the Gaussian curve $D_F$, the MPC range is determined preferably by twice the standard deviation; i.e., approximately one third of the ordinary tolerance range.

The apparatus of FIG. 4 operates therefore as follows:

The two-pole switch 2 is switched to the position I. A direct current voltage e.g., +40 v. from a battery 15 or any other source of electric voltage is thus brought over one pole of the switch 2 to the relay 5. The relay 5 becomes excited, causing the switches 51, 52, 53, 54, 55, and 56 to be actuated, and the operative switch 57 to be closed. The switch arm of the switch 51 connects the green signal lamp 7 to the segment A of the contact set 33. The switch arm of the switch 52 connects the white signal lamp 9 with the segment B of the contact set 33 and the switch arm of the switch 53 connects the red signal lamp 8 to the segment C of the contact set 33. The operative switch 57 connects the contacts 12 and 13 of the electrical gauging device 1.

The switch 54 disconnects the contact 41 from the source 18 of D.C. low (lighting) voltage (e.g. +6 v.). The switch arm of the switch 55 connects the arm 11 of the gauging device 1 into a circuit containing the auxiliary contact 32, which for the time being is open, and a contact of the switch 2, which of course, is now without voltage . The switch arm of the switch 56 connects the electromagnet 31 of the stepping switch 3 through the breaker contact 41 with the source of voltage 15.

Over the second pole of the switch 2 the source 17 of low voltage (e.g., 6 v.) is connected to the arm 11 of the gauging device 1 and as long as there is no article in the measuring apparatus 1, the following circuit is established: direct voltage from the source 17—arm 11—contact 13—contact 57 of the relay 5—polarized relay 4—ground. In idle position the arm 11 of the gauging device 1 bears against the contact 13, because a biasing spring urges the feeler and the arm permanently toward its "lower extreme" position. The contact 41 of the relay 4 is thus opened and the apparatus is now ready to receive the sampling of $n$ pieces and to indicate their statistical control characteristics.

If a "minus" article is inserted into the device 1, the arm 11 remains further held against the contact 13 and no change occurs.

If the tested article has correct dimensions, i.e., is within the MPC limits, the arm 11 leaves the contact 13 without reaching contact 12, with the result that the relay 4 is de-energized, the breaker switch 41 is closed and the voltage from the battery 15 is supplied over the switch 56 to the electromagnet 31, which becomes excited and shifts the arms 33' and 34' of the stepping switch 3 one step. When the article leaves the gauging device 1, the arm 11 rests again against the contact 13, the relay 4 is energized, opens the switch 41, disconnecting thus the electromagnet 31. The stepping switch 3 has carried out one step and the contact arm 33' thereof is still in position on the segment C of the contact set 33, to which the voltage from the battery 17 is supplied. The segment C is connected through the switch 53 to the red signal lamp 8, and ground via a limiting resistance 6.

If a "plus" article is inserted into the gauging device 1, the arm 11 is first lifted from the contact 13, stays for a certain time between the contacts 13 and 12, resting finally against the contact 12. During the time the arm 11 is between the contacts 12 and 13, the stepping switch 3 also carries out one step, as explained hereinbefore. When the article is removed, the arm 11 moves again back between the contacts 13 and 12 and the stepping switch 3 carries out a further step. Consequently when a "plus" articles passes through the device 1, the stepping switch carries out two steps, because the arm 11 moves twice into the intermediate position between the contacts 12 and 13. If the switch 2 were in position II, the sequence of red-white-green-white-red light signals would appear, but, in position I of the switch 2, the gauge 1 causes only the two impulses corresponding to the white light.

After the passage of $n$ articles through the gauging device 1 the stepping switch 3 has carried out a certain number of steps. If the number of steps is smaller than $(n-c)$, wherein $c$ denotes the permissible variation of the statistical characteristic $r_2$ (which for the sake of clarity is taken as $c=R_{rU}=-R_{rL}$), the red signal lamp 8 is lit because the segment C of the contact set 33 comprises a number of contacts corresponding to a sequence of between 1 and $(n-c-1)$. If the number of steps executed is within the range $(n\pm c)$, inclusively, the white signal lamp 9 is lit, because the segment B of the contact set 33 contains a number of contacts corresponding to a sequence of numbers between $(n-c)$ and $(n+c)$. If the number of steps executed exceeds the value $(n+c)$, the green signal lamp 7 is lit. The red light denotes a statistically significant shift of the means towards smaller values, the green light a shift to higher values and the white light indicates that no substantial alteration has taken place. This may be explained as follows:

If the number of articles tested is $n$, the number of "white" impulses W may lie within a range between zero and $2n$. If W is equal to $n$, this signifies that the distribution is disposed symmetrically around the arithmetic mean value. By statistical calculation the permissible deviation $c$ has been determined; i.e., how many impulses in excess of or short of the mean number $W=n$ may be considered permissible. In other words, the apparatus has still to approve a distribution (i.e., the signal lamp 9 has to show a white light), when the number W is within the range between $(n-c)$ and $(n+c)$ (e.g., if $n=10$ and $c=3$, the number of white impulses W after checking a sampling selection of 10 pieces may be between 7 and 13).

The segment C of the contact set 33 must then have $(n-c-1)$ contacts. These contacts may be marked with consecutive numbers 1 to $(n-c-1)$ (i.e., in the quoted example, contacts No. 1 to No. 6). The segment B is provided with $2c$ contacts with consecutive numbers from $(n-c)$ to $(n+c)$ (according to the above example, 6 contacts numbered No. 7 to No. 13). The series A begins with the contact $(n+c+1)$, i.e., with the contact No. 14.

It follows from the above explanation that, although theoretically (according the range 0 to $2n$) $2n$ contacts is considered as the sum of all contacts in the segments A, B, C, it suffices for the purposes of operation, if the segment C is provided with one contact only, because the green lamp 7 flashes as soon as the contact arm 33' of the switch 3 reaches the contact $(n+c+1)$; if the contact arm 33' carried out further steps, this would change nothing in the signalization.

After having finished the measuring or checking of the complete sampling size $n$, the accumulated information contained in the stepping switch 3 can be cancelled as follows:

The switch 2 is placed in position II; the voltage from the source 15 is then applied via the first arm of the switch 2 to the contact set 34 of the stepping switch 3. If the latter is not in its basic position, the voltage is applied over the switch arm 34' of the contact set 34 on the one hand to the relay 5, which becomes energized, and on the other hand to the contact 41 via switch arm 54. The low voltage from the source 17 proceeds over the second arm of the switch 2 to one pole of the auxiliary contact 32. As a consequence of throwing-over the switch 2 to the position II, the voltage from the battery 17 is disconnected from the arm 11, the relay 4 falls off and the electromagnet 31 of the stepping switch 3 becomes energized over the switches 41 and 56. The auxiliary contact 32 is closed thereby. Voltage proceeds over the switch 55 to the arm 11 and contact 13, and the relay 4 is energized, with the result that the current in the stepping switch magnet 31 is interrupted. This process is repeated automatically until the stepping switch reaches its basic position and the contact arm 34' belonging to the contact set 34 leaves the series of connected contacts, so that both the relay 5 as well as the switch 41 are without voltage. The device is thus again prepared for signaling individual measurements performed in the electrical gauging device 1. The arm 11 is supplied with the voltage of the battery 17 through the switch 55, the switch 57 is opened and the voltage from the battery 18 is supplied to the switch 41 through the switch arm 54.

The green signal lamp 7 is connected through the switch 51 with the contact 12 of the gauging device. The red signal lamp 8 is connected through the switch 53 with the contact 13 and the white signal lamp 9 through the switches 52 and 56 with the switch 41.

If in this position II of the switch 2 the arm 11 engages the contact 13, electric current from the source 17 is supplied through the switch 53 to both bulbs 8 and 7. On the bulb 8 the required electric potential is maintained, but as the bulb 7 is connected through the contact 51 to the relay 4, there is not a sufficient potential for lighting this bulb 7. At the same time, the switch 41 is opened by the relay 4, so that also the bulb 9 is without current. In this case it is therefore only the red bulb 8 which emits a signal.

If the arm 11 engages the contact 12, the green bulb 7 is supplied with electric voltage over the switch 51, said bulb 7 being connected over a resistance 6 to ground. However, at the same time also the contact 12 is connected to ground through the relay 4, so that the switch 41 opens and the bulb 9 is without current. It is therefore only the green bulb 7 which emits a signal.

If the arm 11 is in its intermediate position and does not engage either of the contacts 12 or 13, the relay 4 remains without current and only the white bulb 9 is caused by the closed switch 41 to emit a signal.

The apparatus operates therefore in the position II of the switch 2, after the information accumulated in the stepping switch 3 has been cancelled, in the same way as the above mentioned conventional gauging and signaling instrument, so that the MPC limit values $C_L$ and $C_U$ of the quality characteristic necessary for the statistical control according to this invention may be adjusted in a simple manner.

The apparatus shown in FIG. 4 controls correctly the quality of production as far as the change in position of the mean of the distribution of the particular quality characteristic of the tested article is concerned. In mass production it indicates, e.g., any alteration in the setting of the production tools, but does not indicate the dispersion of the quality characteristic distribution that is the degree of quality characteristic distribution that is the degree of accuracy in such production. This feature is indicated by another sample characteristic, e.g., by the sum $$S=z_{+}+z_{-} \qquad (2)$$

FIG. 4 will operate in position II of the switch 2 as a gauge. In position II of switch 2, the switch 3 cannot be activated and the lamps 7, 8 and 9 are ON, singly, according to the position of the arm 11. If the arm 11 is in contact with the contact 12, only the lamp 7 is ON; if the arm 11 engages the contact 13, only the lamp 8 is energized sufficiently to be ON; and in an intermediate position of the arm 11 only the lamp 9 is ON. Therefore, by using articles of predetermined quality characteristics, such as, for example, plates of standard thickness, the mechanical setting of the gauging head 1 can easily be checked and readjusted if necessary. The adjustment of the limits $C_L$ and $C_V$ may, for example, be achieved in the following manner. A plate with its thickness of exactly the lower MPC limit is placed on the measuring track. If the lamp 8 (red) is ON, the gauge should be adjusted (by changing the position of the contact 13) until the point where the red light just changes to white; that is, the lamp 9 goes ON instead of the lamp 8. The contact 13 is then correctly adjusted. On the other hand, if the lamp 9 (white) is ON, the contact 13 should be moved in the opposite direction until the point where the white light just changes to red. Similarly, the position of the contact 12 may be adjusted by means of a plate having a thickness which is exactly the upper MPC limit. Thus it is to be understood that the apparatus of FIG. 4 is meant to operate as a control gauge only when in position II of the switch 2. In addition to this function, the apparatus must fulfill quite a number of operations, immediately after the switch 2 is changed from position I to position II, whereby the stored information of the stepping switch is to be cancelled. This operation is explained in detail in the preceding portion of the present disclosure.

According to a further embodiment of the present invention there is used instead of the sum S according to Equation 2 for the indication of the change in dispersion either the difference defined by a number of impulses representing twice the number of green flashes, minus once the number of white flashes. In a simplified embodiment, the difference between the number of impulses corresponding to the numbers of red and green lights is used for the same indication.

A proof that this procedure is correct is furnished by the simple mathematical consideration given hereinafter.

From the previously disclosed equations:

$$z_{+}=G \qquad (3)$$

$$g=W-2G \qquad (4)$$

$$z_{-}=n+1-R \qquad (5)$$

$$n=z_{+}+g+z_{-} \qquad (6)$$

the following relation can be obtained $$S=z_{+}+z_{-}=n-g=n+2G-W=n-S_2 \qquad (9)$$

Alternatively, the following relation may also be derived $$S=z_{+}+z_{-}=G+n+1-R=n+1+G-R=n+1-S_1 \qquad (10)$$

Considering that the number $n$ is a constant, it is possible to use for an indication of the sum S the number of signals $S_2=W-2G$ according to Equation 9, or alternatively, the number of signals $S_1=R-G$ according to Equation 10.

This embodiment of the invention will be explained in principle with reference to FIG. 5 showing diagrammatically an example of an apparatus operating on the above described basis.

The apparatus of FIG. 5 is for all practical purposes generally similar to the statistical directing apparatus shown in FIG. 4. However, in addition to a provision for indicating a change in the position of the tested quality characteristic of an article, e.g., by means of bulbs 7, 8, 9, means are provided to indicate changes in the dispersion of the same quality characteristic, e.g., by means of a special signal bulb 50.

The apparatus according to FIG. 5 differs from the apparatus according to FIG. 4 by the following features:

The relay 4 is provided with two separate and independent excitement coils, which eliminates the need for switch 57 of relay 5. The resistance 6 is connected between the switches 56 and 52, making the switch 54 redundant. Also the relay 5 has two separate excitement coils. As compared with the embodiment shown in FIG. 4, the diagram according to FIG. 5 comprises the following additional units necessary for the production of the sum $S_2$ according to the Relation 9:

(a) Polarized relay 10 with switch 101,
(b) Telephone stepping switch 20 with electromagnet 201, switch contact 202, contact set 203 and continuous contact series 204,
(c) Resistance 30,
(d) Relay 40 with breaker switch 401,
(e) Signal bulb 50 for indicating a considerably increased dispersion,
(f) Multiple telephone stepping switch 3' of the type of switch 3 (FIG. 4) comprising, in addition to series 33, 34, a number of further contact series 35 to 38, which are also marked in the drawing with ordinal numbers 1, 2, 3, . . . to j.

The arrangement of FIG. 5 operates in position I of the switch 2 as a statistical evaluation unit $S_E$ complete with signaling means $S_M$ (of FIG. 1). The operation is substantially the same as that of the arrangement of FIG. 4, where the lamps 7, 8 and 9 indicate, after the finished measuring of the sampling selection, whether the position of the means of the distribution of the checked quality characteristic has moved significantly from the statistic point of view or not. If there is a significant drift toward higher values, this is signalled by the green lamp 7 (that is, the signalling means $S_B{}^+$ of FIG. 1). If the quality characteristic has moved significantly to the lower values, the red signal lamp 8 (that is, the signalling means $S_B{}^-$ of FIG. 1) is energized. In addition to the function of the device of FIG. 4, the arrangement of FIG. 5 can indicate, by another signalling means $S_B$ of FIG. 1, if a significant change in dispersion of the distribution has occurred or not. The signalling means $S_B$ is shown in FIG. 5 as a lamp 50. After the complete sampling selection has been measured, the lamp 50 indicates whether the number of signals $S_2$ (according to Equation No. 9) is departed from or not. This information amounts to calculating the difference between the number of times the arm 11 of the gauge device 1 has been in the intermediate position (the number of "intermediate positions" or "white impulses" W) minus twice the number of times the arm 11 has touched the upper contract 12 (the number of "upper contacts" or "green light impulses" G), during the passage of the number $n$ articles along the gauging track.

The number of articles contained in the sampling selection $n$ and showing a dimension (or another characteristic under consideration) being above the upper MPC limit, is registered in the stepping switch 20, which moves by one step every time the arm 11 engages the contact 12. This is effected by the relay 10, which by means of the switch 101 supplies current to the electromagnet 201 of the telephone stepping switch 20.

The information stored in the stepping switches 3 and 20 must be wiped out after the complete sampling cycle has taken place and the conditions of the production process have been statistically determined and/or corrected. The wiping out of the information from the stepping switches is effected in a manner similar to that relating to the embodiment of FIG. 4. The switch 2 is placed in position II and the voltage from the battery 15 is applied via the left hand arm of the switch 2 to the contact sets 34 and 204 of the stepping switches 3' and 20. If the switch arm 34' of the set 34 is not in its basic (zero) position, the voltage is applied via said arm 34' to one coil of the relay 5 which thus becomes energized and brings the switches 51, 52, 53, 55 and 56 to their lower positions. The voltage from the battery 16 can then pass via the switch 41 through the just closed contact 56 to the coil of the electromagnet 31 to energize said coil and then pass to ground. The arms of the stepping switch 3' make one step forward and simultaneously the contacts 32 are closed.

The low voltage from the battery 17 proceeds through the right hand arm of the switch 2 to the closed contacts 32 and further via the switch 55, which is also at lower position to the arm 11. Since the arm 11 rests against the contact 13 due to the spring bias, because no article is on the measuring track, the voltage proceeds further via the contact 13 to one coil of the relay 4 and to ground. The relay 4 is then energized and the switch 41 is opened. The circuit from battery 16 to the electromagnet 31 via the switch 56 is then interrupted, said electromagnet is deenergized and the contacts 32 are opened. The opening of the contacts 32 results in interruption of the circuit from the battery 17 to the arm 11 via the switch 55 and consequently the relay 4 is deenergized again, closing the contact 41. The circuit 16, 41, 56, 31, ground is restored again, a second step of the switch 3' is effected, and through closing of the contacts 32, the circuit 17, 32, 55, 11, 13, 4, ground is again restored.

As long as the relay 5 is under voltage, that is, while the circuit 15, 34, 34', 5, ground is closed, the switch steps on, rotating its arm in a clockwise direction. The moment the arms assume their horizontal fundamental position, the circuit 15, 34, 34', 5, ground is interrupted, because the first and the last contact of the series 34 are not connected with the contact set, and the relay 5 is deenergized opening the contacts 55 and 56. At the same time, in a smaller way, the information stored in the stepping switch 20 is wiped out. The voltage from the battery 15 is brought to the interconnected series of contacts 204 and if the arm 204' is not in its basic position, the voltage proceeds through the closed switch arm 401 to the coil of the electromagnet 201 and then to ground. The electromagnet 201 is energized, produces one step of the stepping mechanism and at the same time closes the contacts 202. The voltage then proceeds from the switch arm 204' via the contacts 202 to the relay 40 and to ground; the relay 40 is then energized and opens the switch 401. The circuit 204', 401, 201, ground is thus interrupted and the electromagnet 201 is deenergized, opening the contacts 202. The circuit 204', 202, 40, ground is then again interrupted and the relay 40 is deenergized closing the switch 401 to reenergize the electromagnet 201. This cycle of operation is repeated until the stepping switch 20 is in its zero position; that is, the switch 204' of the contact set 204 is in the horizontal position, as shown in FIG. 5. When both stepping switches 3' and 20 have reached their basic position, the relays 40 and 5 are without voltage. The voltage from battery 17 passes only via the right hand arm of the switch 2 and the switch arm 55 (which is in its upper position) to the arm 11 of the gauging device 1. The arrangement is then ready for use as a color signalling device for the gauging device. The green signal lamp 7 is connected through the switch 51 with the upper contact 12 of the gauging device. The red signal lamp 8 is connected through the switch 53 with the lower contact 13 of the gauging device. The white signal lamp 9 is connected via the switch 52, and the resistance 6 and switches 56 and 41, to the battery 16.

If the arm 11 then engages the lower contact 13, electrical voltage of 6 volts from the battery 17 is applied through switch 55, arm 11, contact 13, switch 53 to red lamp 8 which goes ON. At the same time, the current from contact 13 goes through the relay 4, keeping the contact 41 open, so that the white lamp is disconnected from the battery 16. When the arm 11 disengages from the lower contact 13, and is in an intermediate position between the contacts 12 and 13, the contact 13 is without voltage, and the red lamp is extinguished. The relay 4 gets no current, so that the switch 41 closes. Consequently, the white lamp 9 is connected to the battery 16; the resistance 6 reducing the voltage from 40 volts to 6 volts. The white lamp 9 is ON as long as the arm 11 does not touch either the lower contact 13 or the upper contact 12. The moment the arm 11 touches the upper contact 12, the voltage from the contact 12 is applied to the other energizing coil of the relay 4. The switch 41 opens to extinguish the white light of lamp 9. At the same time, voltage is applied via the switch 51 to the green lamp 7, which is ON as long as the arm 11 engages the upper contact 13. It is therefore evident that the arrangement of FIG. 5 works in the position II of the switch 2 in exactly the same manner as the arrangement of FIG. 4 when the switch 2 is in position II, and the setting of the gauging device 1 may be adjusted in the manner described for FIG. 4.

The individual contacts of the contact series 203 are connected by lines for which only No. 1, 2, *i* and *j* are shown, to series 35 to 38, respectively, of the stepping switch 3' in such a way that the contact of the series 203 marked with a certain ordinal number (1 . . . *j*) is connected with that series of the stepping switch 3, which is marked with the same ordinal number. The first contact of the signal series 203 is thus connected to the series 35, the second contact of the same series 203 to the series 36 etc., until the *j*th contact of the series 203 is connected to the *j*th series 38 of the stepping switch 3'. Each of the series 35 to 38 of the stepping switch 3' has a certain number of first consecutive contacts connected in series with each other, as indicated by interconnecting line. The number K of connected contacts of the *a*th series depends both on the sampling size *n* as well as on the value of the statistical control limit $R_S$ for the sum S.

The number K may be determined from the following simple equation in which: $K=n-R_S+2(a-1)$ . . . the number of connected contacts of the *a*th series of the stepping switch 3', $n=$ . . . sampling size
$R_S=$ . . . value of the control limit for the sum $S=z_++z_-$
$a=$ . . . ordinal number of the series The voltage from the source 15 of 40 v. reduced by the resistance 30 to 6 v. is supplied to the arm 203' of the series 203 of the stepping switch 20. According to the position of arms cooperating with the respective contact series of the stepping switches 20 and 3', the bulb 50 is, after the testing of the sampling *n* has been finished, either lit or not lit. The bulb 50 is grounded at one of its terminals, whereas its other terminal is connected in parallel to all first contacts of series 35 to 38 of the stepping switch 3', interconnected as disclosed above. If, after finished tests of sampling *n*, the bulb 50 emits a light signal, this means that the number of impulses causing the white and green lights to flash was too small to meet the requirements of quality control.

The object of the additional parts of the device in FIG. 5 is to indicate whether the characteristic $$S_2=W-2G$$

is below its statistical control limit $R_{S_2}$. It stands to reason that the range for $S_2$ lies between 0 and *n*. The greatest dispersion is indicated by $S_2=0$ (no quality characteristic within MPC limits) and the best condition regarding accuracy of production is indicated by $S_2=n$, when all measured articles have their values within the MPC limits.

The occurrence of the "green light" impulse is registered by the stepping switch 20. The arm 203' of the contact series 203 engages that contact whose ordinal number (1, 2, . . . *j*) corresponds to the number of the "G"-signals in the particular selection *n*. In position I of the switch 2 this arm 203' has an electrical voltage from the battery 15 applied to it, reduced to light voltage (e.g., 6 v.) by the resistance 30, and as to each contact of the contact series 203 only one contact arm of the contact series 35, 36, 36a, . . . 37 or 38, respectively, is connected, the bulb 50 is alight whenever the arm of the respective contact series (e.g., 36a—i.e., the arm 36a' designated by the ordinal number $a=3$) engages the respective interconnected set of contacts connected via the bulb 50 to ground (in the series 36a the first eight contacts are shown to be interconnected in FIG. 5).

The number of the contacts to be interconnected within each series is calculated in such a manner that the light 50 should show the not permissible diminution of the characteristic $S_2$. The principle of this arrangement will be explained by a chosen example, assuming $$n=10 \qquad R_S=6$$

This means, that out of a selection of 10 pieces not more than 6 may have their measured dimension outside the MPC range or, in other words, at least four articles must be "good" (within MPC limits).

Substituting the chosen values into the equation $$K=n-R_S+2(a-1) \qquad \text{(K)}$$

one obtains for the first contact series 35

$$K_1=4 \qquad (K_1)$$

for the second contact series 36

$$K_2=6 \qquad (K_2)$$

for the third series 36a

$$K_3=8, \text{ etc.} \qquad (K_3)$$

The arm 35' of the first contact series 35 carries an electrical potential if there have been no "green" impulses; i.e., all the articles are either "good" or "minus." If all articles are "minus," there is no "white" impulse and the arm 35' of the contact series 35 is on its first contact. The light 50 is on. If there is one "white" impulse ($W=1$; obviously still $G=0$), the arm 35' has moved one step, if there are two ($W=2$) or three ($W=3$) "white" impulses, the arm has moved to the third or fourth contact, respectively. As, according to the relation ($K_1$) these first four contacts are connected to the bulb 50, this bulb shows by its light, that there are less than four "white" impulses, that is, that there are more than six articles outside the MPC range, which condition is not permissible. On the other hand, if the gauging device 1 transmits four "white light" impulses or more, that is if six articles or less have their quality characteristic under the lower MPC limit $C_L$, the statistical distribution according to the planned limiting characteristic $R_s=6$ is ready to be approved and the lamp 50 is not energized.

The second contact series 36 carries an electrical potential, if there is one "green" impulse; that is, when there is one article "plus." In this instance, the selection can be approved only if the number of "good" articles is greater than three; that is, if there are more than five "white" impulses. According to Equation $K_2$ the first six contacts of series 36 are connected to the bulb 50, ensuring the lighting of the bulb in these four cases:

(1) $G=1, W=2, R=2; (z_+=1, g=0, z_-=9)$
(2) $G=1, W=3, R=3; (z_+=1, g=1, z_-=8)$
(3) $G=1, W=4, R=4; (z_+=1, g=2, z_-=7)$
(4) $G=1, W=5, R=5; (z_+=1, g=3, z_-=6)$

If there are more "white" impulses than five, the light 50 is extinguished.

Similarly, the third contact series 36a having 8 interconnected contacts ensures the lighting of the bulb 50 in the following instances:

(1) $G=2, W=4, R=3; (z_+=2, g=0, z_-=8)$
(2) $G=2, W=5, R=4; (z_+=2, g=1, z_-=7)$
(3) $G=2, W=6, R=5; (z_+=2, g=2, z_-=6)$
(4) $G=2, W=7, R=6; (z_+=2, g=3, z_-=5)$

If there are eight "white" impulses or more, the light 50 is extinguished, showing an allowable dispersion of the distribution.

The operation of the further contact series can be explained in a similar manner, showing the correctness of the Equation K. According to this explanation there would be a theoretical need for $(n+1)$ contacts in the contact series 203 and consequently for the same number of contact series 35 . . . 38, as the maximum number of "green" impulses may equal *n*. There is, however, a possibility of reducing the number of the contact series 35–38, by making the following consideration.

When the number of "green" impulses has reached the value $R_S$, the dispersion of the distribution has already transgressed its limit and the bulb 50 should be alight, whatsoever the other remaining impulses may be. Therefore only $j=R_S+1$ contact series 35 . . . 38 are necessary and the others can be dispensed with. Provisions have to be made obviously (not shown in the drawing in FIG. 5) that in this case a last contact of the series 203 (its ordinal number could be denoted by $k=j+1$) is connected to a further relay having two contacts. The first contact of this (not shown) relay ensures the flashing of the bulb 50 and the second contact puts the relay 10 out of action ensuring, at the same time, the permanent lighting of the bulb 50. This could be achieved in said simple manner, so that the relay 10 in case of the number of "green" impulses exceeding the limiting number $R_S$, would be kept disengaged putting the stepping switch 20 out of action, so long as the canceling circuits controlled by series 204, etc., are not activated.

When the apparatus according to FIG. 5 is used, for instance in mass production of articles of manufacture, the amount of $n$ articles is passed below the spring-biased gauging feeler (connected to arm 11) of the gauging device 1. After the last piece has been passed it has to be ascertained whether a light indicating an increase of dispersion, i.e., the bulb 50, is alight in the apparatus. If the bulb 50 is not alight, it is highly probable that the dispersion has not increased to any considerable extent. The lighting of the bulb 50 for the indication of dispersion changes means that the dispersion has increased to a considerable degree and that the accuracy adjustment of the production tools has to be changed.

In FIG. 2 there was disclosed a statistical evaluating unit $S_E$, where the numbers $z_+$ and $z_-$ were counted and from these the statistical characteristics $$r=z_+-z_- \quad (1)$$

$$S=z_++z_- \quad (2)$$

were obtained. But with the help of the obvious relation $$n=z_++g+z_- \quad (6)$$

the following two equations can be deduced.

From Equations 1 and 6

$$r=2z_++g-n \quad (11)$$

and from Equations 2 and 6

$$S=n-g \quad (12)$$

As the sampling size $n$ is to be considered as a constant number, the following two sample characteristics can be used instead, namely $$r'=2z_++g \quad (11')$$

$$S'=g \quad (12')$$

Of course, the statistical control limits have then to be changed accordingly. When using the characteristic number S′, instead of S, the indication of a non-permissible change of dispersion has to be made whenever the number S′ is less than the statistical control limit $R_{S'}$.

The statistical evaluation by means of the characteristics $r'$ and S′, according to the Equations 11′ and 12′, is especially advantageous when the indication and evaluation of so-called moving statistical characteristics is carried out.

The method of statistical quality-control based on moving sample characteristics is characterized by the fact that the statistical control factors or sample characteristics are evaluated currently on the basis of the latest series of $n$ measurements; i.e., in case of consecutively checking a series of articles, the last measured article is the last member of the sampling. The advantage of this method consists in the fact that the operator's attention is drawn instantly or in a very short time to any fault in the production process, it not being necessary to wait until the checking of the complete sampling number $n$ is finished. Contrary to this, in the normal, discontinuous or interrupted procedure, the sampling is made in batches, and the results for each batch are obtained only after the whole batch has been examined. Only then the next batch can be examined and the control has to wait until the examination of this batch is finished.

The arrangement of FIG. 5 may be used either as shown schematically in the block diagram of FIG. 1 or in the block diagram of FIG. 3 (where fully automatic quality control is provided. In FIG. 1, the block $P_M$ may comprise a centerless grinding machine producing rollers to be used in antifriction (roller) bearings. The checked quality characteristic is then the diameter of the roller, which is to lie in the range 3.99 to 4.01 mm.

For the statistical control plan the following values were established:

$T_L$ equals 3.990 mm.
$T_U$ equals 4.010 mm.
$n$ equals 10
$C_L$ equals 3.997 mm.
$C_U$ equals 4.003 mm.
$R_S$ equals 6
$R_{rU}$ equals +3
$R_{rL}$ equals −3

The measuring gauge $G_A$ of FIG. 1 includes the gauging device 1 of FIG. 5. The measuring pin or feeler to which the arm 11 of the gauging device is attached protrudes into a gauging track in a manner similar to that shown with reference to FIG. 7*a* (gauge $G_{A'}$).

Before the quality control is started, the switch 2 of FIG. 5 is set in position II. By the use of standard plates of thickness 3.997 and 4.003 mm. the MPC limits are properly adjusted in the mechanical part of the gauging device 1 by moving the lower and upper contacts 13 and 12, as aforedescribed. Then, the switch 2 is changed into position I and the arrangement is ready for control of the quality of production. From time to time, ten rollers are taken out from the finished products at random and are passed through the gauging track one immediately after the other. After each batch has passed, the lamps are observed. If only the white lamp 9 is ON, the production is considered to be accurate and no action is taken. A green signal by lamp 7 indicates a significant increase in diameter of the roller, and probably a decrease in the diameter of the grinding wheel. The operator is thus reminded to counteract this decrease by bringing the feeding disc nearer to the grinding wheel. A red signal occurs if the diameter of the rollers starts to decrease; which case would probably arise very seldom in the assumed example. If the lamp 50 is ON in connection with the white signal, it indicates that the precision of the production has significantly deteriorated. In such a case, the grinding machine is stopped and a check is made. It is found in practice that an unevenly worn grinding wheel will usually cause this trouble and by regrinding it the precision of the process can easily be restored. If an automatic quality control is effected, by the arrangement shown in the block diagram of FIG. 3, the batches are taken automatically. After the ten rollers have been passed, the resulting pulses which would be led to the lamps 7 and 8 are passed to correction units $C_{D+}$ and $C_{D-}$ and the impulse of the lamp 50 is used to stop the production by stopping the production machinery.

In FIG. 6 the statistical evaluation unit for "moving" evaluation of statistical characteristics is shown in diagrammatic form. In the block diagram the source $P_M$, the electrical gauging unit $G_A$ and the signaling means $S_M$ are shown analogically to FIG. 1.

The evaluating device $S_E'$, however, comprises several units, namely: a distributing device D, memory means M comprising memory units for example relay units or a magnetic recording tape or the like, an evaluation unit E, a canceling (forgetting) unit F and a switch $S_S$ set to a predetermined constant position.

The operation of the device as shown diagrammatically in FIG. 6 is as follows:

Impulses from the gauging unit $G_A$, corresponding to the measured value of the quality characteristic are transmitted through the distributor D to the memory units M, where they are accumulated and retained in the order in which they were registered. The chosen size of the sampling number $n$ has been set in the switch unit $S_S$.

The evaluating unit E calculates the respective statistical characteristics from the values contained in the memory units M and transmits a corresponding electrical voltage to the signaling means $S_M$ if the value of the statistical characteristic exceeds the predetermined statistical control limits, as has already been explained.

The unit E, contrary to the evaluating units described up to now, may operate also at the time when the number of measurements has not yet reached the number $n$. During this time the momentarily evaluated statistical characteristics are compared with predetermined statistical control limits, which correspond to the number of measurements effected up to this moment.

When the number of measurements has reached the sampling number $n$, the statistical control limits, with which the sample characteristics are to be compared, have of course already their normal value (i.e., determined for the number $n$). After the next measurement has taken place, the number of measurements would be $(n+1)$. Therefore the information about the first measurement has to be wiped out. This is achieved with the help of the canceling (forgetting) unit F, which deletes the first measured value. Each further measurement effects the canceling of a further previously recorded (at the time being: the "first") information, so that always only the latest $n$ informations are held accumulated in the memory means M.

Provision has to be made, of course, that stopping of the production process should wipe out the information in the memory device M. The production would have to be stopped, if, for example, the signaling unit $S_B$ should show an inadmissible dispersion of the quality characteristic.

The wiping out of the complete information from the memory device M is also necessary if, due to the statistical control, a resetting of the production tools in one of the directions "plus" or "minus" of the quality characteristic has been effected, even if this resetting operation has been done without stopping production. In case that the stored information before such re-adjustment had remained in some memory units, the results of statistical control immediately after the adjustment would be distorted and not in accord with the new setting of the machine.

An example of an embodiment of the statistical control apparatus based on moving characteristics and working with the characteristics $r'$ and S' according to the Equations 11' and 12' is shown diagrammatically in FIG. 7.

From the source $P_M$—which in this example is represented by a centerless grinding machine—the articles are fed to a dimensional sorting device $S_T$ where they are sorted according to the predetermined MPC limits $C_L$ and $C_U$ into three groups: the "plus" group (+), the "good" group ($g$) and the "minus group" (−). The counter $C_n$ emits an electrical impulse for each article, whereas the counters $C_{z+}$ and $C_g$ transmit impulses whenever an article belongs to the "plus" and "good" group, respectively.

The distributing device D distributes for each measured article the corresponding impulse—"plus," "good" or no impulse (that is "minus")—to a corresponding memory unit. When sorting the first article the information is imparted to the memory unit $M_1$, for the second article into $M_2$, for the third article into $M_3$ and so on. The memory unit registers whether the corresponding article belongs to the group "plus" or "good"; if the article is in the "minus" group, this memory unit obtains no impulse and remains empty.

A simple embodiment of one memory $M_1$ unit is shown in FIG. 8 as an example. The relays $R_+$ and $R_g$ are fed from the distributing device D with impulses (+) and ($g$) at the input terminals $t$ and actuate the switch arms $C_{+1}$, $C_{+2}$, $C_{+3}$ and $C_{g1}$, $C_{g2}$ and $C_{g3}$, respectively. An impulse (+) energizes the relay $R_+$, which opens the switches $C_{+1}$ and $C_{+3}$ and closes the switch $C_{+2}$. By closing the switch $C_{+2}$ the relay $R_+$ is energized and held by a source of D.C. voltage—battery $B_1$ (e.g., +40 v.)—and thereby the switch $C_{+3}$ is kept in its open position, whereby an ohmic resistance 2R$a$ is connected into the circuit $e_r$. An impulse ($g$) puts the relay $R_g$ into action, by which the switch $C_{g1}$ is closed and the switches $C_{g2}$ and $C_{g3}$ opened. The closed switch $C_{g1}$ ensures that the relay $R_g$ is kept energized by the source of D.C. voltage $B_1$. The opening of the switch $C_{g3}$ connects the ohmic resistance $R_a$ into the circuit $e_r$, and the open switch $C_{g2}$ connects the ohmic resistance $R_b$ into the circuit $E_{S'}$. The third relay $R_f$ actuates the canceling unit F, that is, by an impulse ($f$) energizing the relay $R_f$ the contact $C_f$ is opened and the current through any one of the activated relays $R_+$ or $R_g$ is interrupted whereby the information accumulated in this memory unit is wiped out. This wiping out impulse ($f$) is obtained from the canceling distributor F, as will be explained later. Also, if the machining process has been stopped or a statistical control adjustment has been effected, the impulse ($f$) is sent to all memory units.

The distributing device D may with advantage be constructed as a conventional telephone stepping switch T as shown diagrammatically in FIG. 9. The switch T has three operative contact series of which $T_1$ distributes the impulses ($g$) from the various contacts over the channels $1g'$–$1g$, $2g'$–$2g$ . . . $Ng'$–$Ng$ to the corresponding memory unit. Similarly from the contact series $T_2$ the impulses (+) are distributed through the channels $1_+'$–1, $2_+'$–2 . . . $N_+'$–N . . . as shown also in the diagram FIG. 7. The stepping mechanism of the contact arms is shown diagrammatically at $T_E$, where $T_E$ is drawn as an electromagnet supplied with electrical impulses ($n$). For each measured article the counter $C_n$ (FIG. 7) emits an electrical impulse ($n$), which is led to the electromagnet $T_E$ and this in turn induces the contact arms to carry out for every impulse ($n$) one step in clockwise direction.

The third contact series $T_3$ has its contacts respectively connected to those of a selector switch $S_S$ so that the first contact $1s$ of the series $T_3$ is connected to the first contact $1s'$ of the switch $S_S$ and so on. The arm $A_S$ of the switch $S_S$ can be set manually into any position. In case that the statistical control apparatus works with a sampling number $n$, the arm $A_S$ is positioned on the $n$th contact $ns'$ of the switch $S_S$ as shown in FIG. 9. The arm of the contact series $T_3$ moves in the same way as the contact arms of the series $T_1$ and $T_2$ and is under a voltage of the D.C. source $B_2$. When the $n$th article passes through the sorting device $S_T$ in FIG. 7, the contact arm of the series $T_3$ is in the position indicated by dotted lines and the voltage is led via the channel $ns$–$ns'$ (not shown) into the selector switch $S_S$. The arm $A_S$ of the switch $S_S$ being also in the same position, the impulse can reach a relay $F_R$ which becomes energized. The relay $F_R$ closes two switches $F_{C1}$ and $F_{C2}$. The closed contacts $F_{C2}$ keep the relay $F_R$ under permanent voltage from the D.C. source $B_2$ and the contact $F_{C1}$ enables the canceling switch $F_S$ of the canceling device F to be put in operation. The switch $F_S$ is also a telephone stepping switch with an electromagnet $F_E$, which through the closing of the switch $F_{C1}$ is supplied with an impulse ($n$).

When the next impulse ($n$) arrives, that is when the $(n+1)^{st}$ article is sorted, the arm of the switch $F_S$ is already in its first position, and the voltage is led as an impulse $(f)$ through the channel $1f'$–$1f$ (not shown) into the canceling relay $R_f$ of the first memory unit $M_1$ (FIG. 8), wiping out the information accumulated therein. The next step effected by a further measuring operation wipes out the information in the unit $M_2$, because the arm of the switch $F_S$ energizes via the channel $2f'$–$2f$ (not shown) the canceling relay $R_f$ of the second unit $M_2$, and so on. It is obvious that the stepping of the switches T and $F_S$ goes on jointly as long as the production and testing process continues; after the Nth contact the first contact is connected again and the contact arms move always on rotatingly, the arm of the switch $F_S$ being $n$ contacts behind the contact arms of the switch T.

From the foregoing explanation it can be concluded that the number N of the memory units should be larger than the sampling number $n$. But it has to be noted here that provisions can be made, that $n$ should equal N. In this special case, the canceling of a certain unit would of course have to precede its filling; that is, the impulses $(g)$ and $(+)$ would have to be delayed at least by a minute time interval with regard to the impulses $(f)$.

The accumulated information in all memory units is evaluated by means of the evaluation units $E_{r'}$ and $E_{S'}$ which are made parts of the circuit $e_{r'}$ or $e_{S'}$ respectively.

In the circuit $e_{S'}$ as many ohmic resistances $R_b$ (FIG. 8) are connected in series with a battery $B_{S'}$ as there are impulses $(g)$ that have been registered in the memory units during the latest selection of $n$ articles. According to the Equation 12′ this number $g$ can be used as the characteristic S′ for estimating the dispersion (that is the flattening of the curve $D_F$ according to FIG. 1$a$). The total ohmic resistance $\Sigma R_b$ of the circuit $e_{S'}$, which includes all memory units $M_1, M_2 \ldots M_N$ is to be, therefore, a proportional function of the characteristic S′. The value $R_{S'}$ being the statistically predetermined control limit for the number S′, the comparison between measurements and set limits can be expressed mathematically in this way:

$$\Sigma R_b \geqq R_{S'} \cdot R_b \qquad (13)$$

wherein $\Sigma R_b$ denotes the sum of active ohmic resistances $R_b$ in all memory units.

If the Expression 13 is complied with, the precision of the production process can be considered to lie within the permissible range; in the opposite case that is, if $$\Sigma R_b < R_{S'} \cdot R_b \qquad (13a)$$

an electric impulse is transmitted to the signaling bulb $S_B$ (FIG. 7) and the flashing of the bulb $S_B$ indicates that the production process should be stopped and its dimensional setting readjusted.

Similarly the evaluation unit $E_{r'}$ evaluates the sample characteristic $r'$ according to Equation 11′. The number $r'$ gives information as to the change in position of the mean of the distribution curve $D_F$. If $\Sigma R_a$ is to denote the total ohmic resistance as the sum of the active resistances $Ra$ and $2Ra$ in all memory units (FIG. 8), this sum is to be proportional to the number, $$r' = 2z_+ + g \qquad (11')$$

The sample characteristic $r'$ must lie between the control limits $R_{r'L}$ and $R_{r'U}$, if the quality characteristic under consideration (i.e., a diameter in this instance) has changed only by an admissible amount. Therefore the following expression must be satisfied $$R_{r'L} \cdot R_a \leqq R_a \leqq R_{r'U} \cdot R_a \qquad (14)$$

In this case no signaling takes place. If $$R_a < R_{r'L} \cdot R_a \qquad (14a)$$

the red bulb $S_B^-$ is made to flash, and in the case that $$R_a > R_{r'U} \cdot R_a \qquad (14b)$$

the green light $S_{B+}$ is signaled. The impulses to the signaling means $S_B^-$ and $S_B^+$ can evidently, in case of automatic control, be used to effect the necessary adjustments of the production machine $P_M$.

The above mentioned control limits $R_{r'L}$, $R_{r'U}$ and $R_{S'}$ are given by the statistical control plan and depend among other quantities on the sampling number $n$.

As described above, when starting the production process, the number of measurements and therefore the number of activated memory units is smaller than the sampling number $n$. Differing values of the control limits determined according to the number of measurements taken, are therefore to be transmitted for comparison into the evaluation units $E_{r'}$ and $E_{S'}$. Diagrammatically this is shown in FIG. 7, where the units $(R_{r'L})$, $(R_{r'U})$ and $(R_{S'})$ denote devices which are actuated by impulses $x<n$ from the distributing device D, and transmit the values of the control limits according to the number of taken measurements. After this number has reached the sampling number $n$ for the first time, the number $x$ remains, of course, constant and equal to $n$.

The memory unit as shown in FIG. 8 has still another interesting feature. It is to be noted that only one of the relays $R_+$ or $R_g$ can stay energized. If the relay $R_g$ has been energized and the voltage then applied to the relay $R_+$, the opening of the contact $C_{+1}$ deenergizes the relay $R_g$. On the other hand, if the relay $R_+$ has been energized, it holds the contact $C_{+1}$ in its open position and the relay $R_g$ cannot hold itself energized. It may therefore be concluded that if only an impulse $(g)$ is fed into the memory unit the relay $R_g$ becomes energized, and if any combination of impulses $(+)$ and $(g)$ comes in, only the relay $R_+$ is energized and also held energized after the impulse. This feature is very advantageous, as a measuring or gauging unit similar to that described in connection with FIGS. 4 and 5 (and denoted there by reference numerals 1, 11, 12, 13) can be used instead of the sorting device $S_T$ and counters $C_{z+}$ and $C_g$ (FIG. 7). In this case it will be sufficient if only the impulses which correspond to the green and white lights are emitted.

This alternative is shown in FIG. 7$a$. The gauging unit $G_A'$ is set to the statistically predetermined MPC limits $C_L$ and $C_U$ and emits an impulse (G) whenever the measured dimension is being measured as outside "plus," and an impulse (W) in case the measurement is within the limits $C_L$ and $C_U$. Thus in case a "plus" article is passed under the gauge $G_{A'}$ there are three impulses transmitted in succession namely (W), (G) and again (W); if a "good" article is passed only the impulse (W) is emitted. The impulses (G) and (W) can be used in the same apparatus as illustrated in FIG. 7 instead of the impulses $(+)$ and $(g)$, respectively, and the information accumulated in the memory units will be exactly the same as if the sorting device $S_T$ with the counters $C_{z+}$ and $C_g$ were used.

It is to be noted that in the memory units any other electrical quantities instead of the resistances $R_a$, $2R_a$ and $R_b$ can be used. Thus voltage-adding units (e.g., batteries) or electrical capacities, etc. can be switched into the circuits.

The memory units can also operate in a manner different from adding electrical quantities. A memory unit working on the so-called digital system is shown in FIG. 10 in which the elements corresponding to those of FIG. 8 are designated with the same reference characters.

Each memory unit $M_1'$ according to FIG. 10 comprises a relay $R_+$ and a relay $R_g$ with their first contact $C_{+2}$ and $C_{g1}$ which are adapted to keep them energized. As in the memory unit $M_1$ previously described, the relay $R_+$, when energized, opens a contact $C_{+2}$, which interrupts the electric connection from the D.C. source $B_1$ to the contact $C_{g1}$, preventing the relay $R_g$ from becoming energized. The unit in FIG. 10 differs from the memory unit of FIG. 8 in that it contains for both relays $R_+$ and $R_g$ two additional contacts, which are so arranged and connected that upon energization of the coils one of said additional contacts is opened and one becomes closed. The opening contacts $C_{+4}$ and $C_{g4}$ are closed as long as no impulse (+) or (*g*), respectively, has entered the memory unit, that is if both relays $R_+$ and $R_g$ are not energized. This is the case when an article of a smaller dimension than the lower MPC limit $C_L$ has been measured. The line *v* then carries a potential from a D.C. source $B_1$.

In case a "good" article has been measured, the dimension of which lies between the limits $C_L$ and $C_U$ the relay $R_g$ becomes energized and closes the contact $C_{g5}$, so that the line *u* is supplied with voltage from the source $B_1$.

If the measured article has a dimension exceeding the upper MPC limit $C_U$, only the relay $R_+$ becomes energized, the contact $C_{+5}$ closes and the voltage from the source is fed to the line *t*.

The information accumulated in the memory unit $M_1'$ according to FIG. 10 is expressed by the circumstance that only one of the lines *t*, *u* or *v* is connected to the source $B_1$, whereby the respective line *t*, *u* or *v* indicates whether the measured article was "plus," "good" or "minus."

Evidently, the impulses from the lines *u*, *t* and *v* can be very helpful in building up the necessary sample characteristics from the last *n* measurements, that is from the number *n* of memory units which have most recently obtained their information.

The evaluating unit for this case is not shown in the drawings as the procedure may be carried out in various known ways (for example by a device according to U.S. Patent 2,679,355). However, it must be borne in mind that only the last *n* informations are to be taken into account at any time.

If therefore $J_{uk}$ denotes the sum of all measurements by which the line *u* has been energized (i.e., when the measured article was within MPC limits) from the first article up to a *k*th article measured (i.e., from the time the production has been started up to the time when the *k*th memory unit has been filled with information)—(the number *k* may, of course, be larger than the total number N of available memory units) and similarly $J_{u(k-n)}$ . . . a similar sum up to the $(k-n)$th article, the characteristic according to Equation 12′ can be expressed as $$S'=g=J_{uk}-J_{u(k-n)} \qquad (12'')$$

For evaluating this characteristic it would be possible to use two counters, for example telephone stepping switches similar to those described above, one of the switches being *n* steps behind the other. The required contact sets may with advantage be provided on the stepping switches T and $F_S$ (FIG. 9), because, as shown before, the arm of the switch $F_S$ lags *n* steps behind the arm of the switch T.

When evaluating the sample characteristic *r* according to the Equation 1 relations similar to the Equation 12″ have to be obtained for each of the numbers $z_+$ and $z_-$. Analogously to the expressions $J_{uk}$ and $J_{u(k-n)}$ the expressions $J_{tk}$, $J_{vk}$, $J_{t(k-n)}$, $J_{v(k-n)}$ denote the sums of measurements by which the line *t* or *v*, respectively, has been energized, up to the *k*th or $(k-n)$th article, respectively. There is therefore $$z_+=J_{tk}-J_{t(k-n)} \qquad (15a)$$
$$z_-=J_{vk}-J_{v(k-n)} \qquad (15b)$$

From the Equations 15*a*, 15*b* and 1 there follows:

$$r=z_+-z_-=J_{tk}-J_{vk}-[(J_{t(k-n)}-J_{v(k-n)})] \qquad (15)$$

As an evaluating unit for this Equation 15 two pairs of contact sets can be used, preferably provided in the stepping switches T and $F_S$, respectively, which transmit the impulses to a comparing unit which will be described later.

It is evident, that for determining the sample characteristic pertaining to the dispersion of the distribution function $D_F$, instead of the Equation 12 the Equation 2 can be used. From the Equations 15*a*, 15*b* and 2 the following expression is obtained $$S=z_++z_-=J_{tk}+J_{vk}-[J_{t(k-n)}+J_{v(k-n)}] \qquad (16)$$

which shows that the lines *t* and *v* of the memory units can be used just as well for the above stated purpose instead of the line *u*, which in this case could be dispensed with altogether.

In FIGS. 11 and 12 embodiments of a comparing unit are shown, into which information about the sums according to the Equations 15, 16 or 12″ is fed. Such a device can be used in conjunction with the memory units according to FIG. 10, but the apparatus shown in FIG. 2 could just as well be equipped advantageously with comparing units according to FIGS. 11 or 12.

The comparing unit in FIG. 11 is shown, for the sake of simplicity, as provided for a number N equalling six, i.e., only six memory units. It consists of two identical stepping switches X and Y each with two contact series. The electromagnet $X_E$ of the switch X is supplied with impulses corresponding to the "plus" measurements, whereas the electromagnet $Y_E$ of the switch Y is supplied with impulses corresponding to the "minus" measurements. Thus in case of statistical control of dimensions of articles of production the stepping switch X registers the occurrence of articles with a dimension above the upper MPC limit $C_U$ and during the process the position of the arms $X_A$ and $X_{A'}$ corresponds to the number $z_+$, and the stepping switch Y registers the occurrence of articles with a dimension under the lower MPC limit $C_L$ and the position of the arms $Y_A$ and $Y_{A'}$ corresponds to the number $z_-$. The purpose of the comparing unit in FIG. 11 is to indicate, whenever the difference $$r=z_+-z_- \qquad (1)$$

is greater or smaller than the predetermined statistical control limits $R_{rU}$ and $R_{rL}$ respectively. In the embodiment in FIG. 11 the two control limits are chosen:

$$R_{rU}=1 \qquad R_{rL}=-1$$

that is, the comparing unit has to indicate, for example, by a green light, if $$r=z_+-z_-=R_{rU}+1=2$$

and by a red light, if $$r=z_+-z_-=R_{rL}-1=-2$$

The arms $X_A$ and $X_{A'}$ of the stepping switch X are supplied with a voltage of, e.g., 40 v. from a battery $B_X$. The contact arms $Y_A$ and $Y_{A'}$ of the switch Y are each connected to a relay $R_a$, $R_b$, respectively; thus if current enters the arm $Y_{A'}$, the relay $R_a$ is energized and closes by means of a contact $C_a$ an electric circuit for a bulb $S_a$ supplied with current from a low voltage battery $b_a$. Similarly current from the contact arm $Y_A$ energizes the relay $R_b$, so that the contact $C_b$ is closed and the bulb $S_b$ connected to a battery $b_b$ flashes.

The contact series $x_1'$, $x_2'$ . . . $x_b'$ of the switch X is connected to the contact series $y_1$, $y_2$ . . . $y_6$ in such a manner that the first contact $x_1'$ is connected to the third contact $y_3$, the second contact $x_2'$ to the fourth contact $y_4$ etc. The fifth contact $x_5'$ is connected to $y_1$ and the contact $x_6'$ to $y_2$. Therefore, if the contact arm $Y_A$ is two contacts ahead of the arm $X_{A'}$ (positions shown in dotted lines at the contact $x_2'$ and $y_4$) the red light $S_b$ flashes. That means that $z_+$ is smaller than $z_-$ by the number two, or in other words the lower control limit $R_{rL}$ has just been transgressed.

On the other hand the contact $x_1$ of the other series of the switch X is connected to the contact $y_5'$ of the second series of the switch Y, the contact $x_2$ to the contact $y_6'$, the contact $x_3$ to the contact $y_1'$ etc. The green light $S_a$ flashes whenever the arm $Y_{A'}$ is two contacts behind the contact arm $X_A$, that is if the upper limit $R_{rU}$ for $z_+ - z_-$ is just being exceeded.

In case of a normal, batch-wise quality control, i.e., checking a fixed number of articles, the electromagnet $X_E$ is supplied with impulses from the counter $C_{z+}$ and the electromagnet $Y_E$ from the counter $C_{z-}$ (for example according to FIG. 2) and after measuring the complete sampling size $n$, the degree of compliance with the measured quality characteristic will have been ascertained.

If the principle of quality control based on moving characteristics is effected and a number N of memory units according to FIG. 10 used, the impulses denoted $x$ and $y$ have to be admitted into the comparing unit following the Equation 15. This is achieved in this way: after registering the information in the unit $M_k$ The impulse $t$ from the unit $M_{k-n}$ is supplied as $y$
The impulse $v$ from the unit $M_{k-n}$ is supplied as $x$
The impulse $t$ from the unit $M_k$ is supplied as $x$
The impulse $v$ from the unit $M_k$ is supplied as $y$ The reason for supplying the impulses from the memory units a number $n$ "behind" is that this information has to be subtracted to keep only the information of the last $n$ units in the two switches X, Y. The subtraction can obviously be achieved by adding the positive information (+1) to the counter of the negative information and vice versa.

It is to be noted here once more that instead of the signaling means $S_a$ and $S_b$ a connection to a servo-mechanism can be made and instead of the flashing of the appropriate bulb a positive or negative adjustment of the production means (e.g., by moving the cutting tool, etc.) can be effected.

A suitable evaluating unit may comprise any arrangement adapted to signal the reaching of a predetermined electrical quantity such as resistance, voltage or current. If this quantity is reached, either a signal is provided by lighting the respective lamp and/or the respective impulse is utilized in the servo-system to correct or stop the production process. Especially suitable in such arrangements are thyratrons. Arrangements suitable for use as evaluating units are shown by Merrill et al. in U.S. Patent No. 2,688,441, in the arrangement of the "Distribution Classifier." Here, after the grid voltage has reached a limit preset by a potentiometer, a thyratron is fired and the respective relay in the anode circuit of an electron tube is energized. Another example of such an arrangement is the electron voltmeter illustrated in FIG. 7 of U.S. Patent No. 2,664,557 to Sargrove. Here, the charge on the capacitor G11 is measured and the departure from predetermined limits is indicated (U.S. Patent No. 2,664,-557, column 11, line 55 to column 12, line 36).

Evaluating units for the memories of FIG. 10 are illustrated in FIGS. 11 and 12, as described in the present disclosure. In the units of FIGS. 11 and 12, the relays $R_a$ or $R_b$, respectively, are activated whenever the respective statistical control limit is departed from. In the case of the sample characteristic $r$, the closing of one switch, such as, for example, $C_a$ signals to the operator or to the servo system of the production machine for an increase, and the closing of the other switch $C_b$ signals for a decrease, of the check quality characteristics. In the case of the sample characteristic S, only one relay $R_a$ or $R_b$ is sufficient and the closing of such relay induces the operator or the servo system to stop the production by stopping the production machinery.

The operation of the evaluating unit (FIGS. 11 or 12) in connection with the memories of FIG. 10 can be explained by the block diagram of FIGS. 7 and 7*a*. The electrical impulses of a gauge (according to FIG. 7*a*) designated as R, W and G pass into the distributing unit D. The distributing unit D is shown in more detail in FIG. 9 and the impulse G reaches the switch arm of the contact set $T_2$, marked + and the impulse W reaches the contact set T through the line "$g$." In FIG. 7, the first contact $1g'$ and $1+'$ of the distributing unit D are connected to the impulse lines $g$ and + of the first memory unit $M_1'$, the second contacts $2g'$ and $2+'$ to the same impulse of the second memory unit $M_{2'}$, etc. Thus, the impulse G is passed to the impulse marked + of a memory unit of FIG. 10 if the respective article is "outside plus." The impulse W is fed to the input "$g$" of said memory unit if the article is "within limits," and said memory unit gets no impulse if the article is "outside minus." According to the measured value of each article, therefore, the respective memory unit has either the lines $t$, $u$ or $v$ under voltage from the battery B. The line $t$ is under voltage in case of the "outside plus" article, the line $u$ in case of the "good" article, and the line $v$ in case "outside minus" article, as stated in the present disclosure. The arrangement, as discussed in the present disclosure hereinbefore, is shown diagrammatically in FIG. 9A, which corresponds to FIG. 9 with the exception that the distributing unit D is elaborated by a unit $D_A$ comprising three more contact sets $T_4$, $T_5$, $T_6$ and a relay $R_D$ with three switch arms. Similarly, the cancelling unit F is amplified by a unit $F_A$ comprising three further contact sets $F_{S1}$, $F_{S2}$, $F_{S3}$ and a relay $R_F$ with three switch arms. The contact sets $T_5$ and $F_{S2}$ are the two counters therefore discussed in the present disclosure, and their contact point $1u$ and $1u'$ are connected to the output $u$ of the first memory unit $M_1'$, the points 2 and $2u'$ to the second unit $M_2'$, etc. Similarly, the contact sets $T_4$, $T_6$ and $F_{S1}$, $F_{S3}$ are the two pairs of contact sets aforementioned in the present disclosure and the contact points $1t$ and $1t'$ as well as $1v$ and $1v'$ are connected with the output terminals $t$ and $v$ of the first memory unit $M_1'$, etc. The relays $R_D$ and $R_F$ are energized by the impulses $n$ and when energized close the switch arm $C_{D1}$, $C_{D2}$, $C_{D3}$ and $C_{F1}$, $C_{F2}$ and $C_{F3}$, respectively, which are on the output lines $t$, $u$, $v$ and $t'$, $u'$, $v'$ from the respective arms of the contact sets. Two comparing units according to FIG. 12 are used as evaluating units, the evaluating units for $r$ being denoted by the block $E_r$ and the evaluating unit for S' being denoted by $E_{S'}$. The signalling lamps shown in FIG. 9A are designated by $S_B^+$, $S_B^-$ which correspond to $S_a$ and $S_b$ of the comparing unit $E_r$ in FIG. 12 and the lamp $S_B$ corresponds to the lamp $S_b$ of the unit $E_{S'}$, because as aforestated in the present disclosure the switch $K_2$ and consequently the contact sets $X_{Ab}$, $Y_{Aa}$ and relay $R_a$ with lamp $S_a$ are redundant when having only one limit + which can be exceeded. The lines $t$ and $v'$ are connected to the inputs $x$ of the unit $E_r$. The lines $v$ and $t'$ are connected to the input $y$ of the same unit. The line $u$ is connected to the input terminal $x$ of the unit $E_{S'}$. The line $u'$ is connected to the terminal $y$ of $E_S$. The relay $R_D$ is a delayed action relay.

A short time after a certain memory unit $M_k$ has been fed via the distributing stepping switches $T_1$ and $T_2$, the relay $R_D$ is energized, closing the three switches $C_{D1}$, $C_{D2}$ and $C_{D3}$. There is voltage in only one of the lines $t$, $u$ or $v$ and this one impulse is given either to the unit $E_r$ or $E_{S'}$. In case an "outside plus" article is measured, the impulse $t$ is provided and in the unit $E_r$ a plus unit is registered. If an "outside minus" article is measured, the impulse $v$ insures the registering of a minus unit. If a "good" article is measured the unit $E_{S'}$ receives a plus impulse. Thus, the information about the $k$th article has been registered in the evaluating unit. Before such information is entered, however, it is necessary to wipe out the information of the evaluating unit, which has been entered $n$ (the number of samples) articles before. This is achieved by the cancelling stepping switch, which steps, as described, $n$ steps behind the distributing switch so that the arms are connected to the $(k-n)$th memory unit $M_{(k-n)}$. The information from this memory unit must be removed before the wiping out process. The relay $R_f$ of the memory unit of FIG. 10 thus has a delayed action in comparison to the quick action relay $R_F$. When the relay $R_F$ is energized the switches $C_{F1}$, $C_{F2}$ and $C_{F3}$ are closed, and the information about the $(k-n)$th article is wiped out in the evaluating units $E_r$ or $E_{s'}$. If the $(k-n)$th article is "outside plus" then a plus unit has previously been registered. To cancel this out, the line $t'$ is connected to the input $y$ of the units $E_r$.

If an impulse is provided to the input $y$ a minus unit is registered, which is equivalent to subtracting a plus unit. Analogously, the line $v'$ is connected to the input $x$ of the unit $E_r$ to wipe out a previous negative information by adding a positive unit. Similarly, if the $(k-n)$th article has been "within limits" a unit has to be subtracted from the total registered in the evaluating unit $E_{s'}$. This is achieved by supplying a pulse to the negative input $y$. Thus, the information which has been stored in the arrangement for the time of testing the batch of $n$ articles has been utilized, and may be forgotten, as noted. As stated in the present disclosure, the line $u$ may be dispensed with and the lines $t$ and $v$ may be utilized for evaluating the sample characteristic S in a unit $E_S$.

In FIG. 12 an embodiment of the comparing unit is shown in which the control limits can be changed at will. This is of particular interest when using the "moving" sample characteristics, because as explained above, before the number of measurements reaches the number $n$, different control limits have to be used for comparing the data obtained from the memory units.

The lower part of the diagram in FIG. 12 corresponds to the lower part of FIG. 11 and the same denotations are used here as in FIG. 11 as far as the same elements are shown. The stepping switch X has a contact series $x_{a1}$, $x_{a2}$, $x_{a3}$ . . . $x_{aN}$ with its contact arm $X_{Aa}$, and a contact series $x_{b1}$, $x_{b2}$, $x_{b3}$ . . . $x_{bN}$ with an arm $X_{Ab}$. Similarly the stepping switch Y comprises two series of contacts namely: $y_{a1}$, $y_{a2}$, $y_{a3}$ . . . $y_{aN}$ and $y_{b1}$, $y_{b2}$, $y_{b3}$ . . . $y_{bN}$ with their contact arms $Y_{Aa}$ and $Y_{Ab}$, respectively.

To connect the contacts of the series $x_{a1}$, $x_{a2}$, $x_{a3}$ . . . $x_{aN}$ with the contacts series $y_{b1}$, $y_{b2}$, $y_{b3}$ . . . $y_{bN}$ in any required relation, a multipole multicontact switch is used as indicated diagrammatically at $K_1$. Similarly another identical switch $K_2$ connects the contacts $x_{b1}$, $x_{b2}$, $x_{b3}$ . . . $x_{bN}$ with the contact $y_{a1}$, $y_{a2}$, $y_{a3}$ . . . $y_{aN}$, the connections from these contacts to the switch $K_2$ being omitted for the sake of clarity.

The switch $K_1$ comprises a series of contact points $x_{a1}'$, $x_{a2}'$, $x_{a3}'$ . . . $x_{aN}'$ arranged in a circle $K_{1x}$ which are engaged by the same number of contact brushes $y_{b1}'$, $y_{b2}'$, $y_{b3}'$ . . . $y_{bN}'$ mounted on a rotatable ring $K_{1y}$. The contact points $x_{a1}'$, $x_{a2}'$, $x_{a3}'$ . . . $x_{aN}'$ are connected with the contacts $x_{a1}$, $x_{a2}$, $x_{a3}$ . . . $x_{aN}$ of the stepping switch X and the brushes $y_{b1}'$, $y_{b2}'$, $y_{b3}'$ . . . $y_{bN}'$ with the contact series $y_{b1}$, $y_{b2}$, $y_{b3}$ . . . $y_{bN}$ of the stepping switch Y respectively. By turning the ring $K_{1y}$ in relation to the circle $K_{1x}$ an engagement of any brush $y_{b1}'$, $y_{b2}'$ . . . $y_{bN}'$ with the contact-point $x_{a1}'$ can be obtained. Thus if the brush $y_{b3}'$ touches the contact point $x_{a1}'$, each contact point is in engagement with a brush having an index number higher by two numbers, that is, similar connections are made as drawn in the embodiment of FIG. 11 for the series $x_1'$, $x_2'$, $x_3'$ . . . $x_6'$ and $y_1$, $y_2$ . . . $y_6$. When the contact arm $Y_{Ab}$ is then two contacts ahead of the contact arm $X_{Aa}$ the bulb $S_b$ flashes, or in other words, the lower control limit $R_{rL}=-1$ has been set.

If it is desired, for example, to set the lower control limit $R_{rL}=-3$, the inner ring $K_{1y}$ has to be turned in counter-clockwise direction—indicated by the arrow "—" by 4 contact steps, that is the brush $y_{b5}'$, would have to lie against the contact point $x_{a1}'$. Any value of $R_{rL}$ can thus be set by turning the ring $K_{1y}$ in counter-clockwise direction.

The turning of the ring $K_{1y}$ in clockwise direction—as indicated by the arrow "+"—would establish such a connection between the contact series $x_{a1}$ . . . $x_{aN}$ and $y_{b1}$ . . . $y_{bN}$, that the flashing of the bulb would occur, when the contact arm $Y_{Ab}$ would be so many contacts behind the contact arm $X_{Aa}$ as corresponds to the number of contact steps made in moving the ring $K_{1y}$, that means this number diminished by one would be the applied upper control limit.

For this reason an identical second multipole multicontact switch $K_2$ is provided between the alternative contact series $x_{b1}$, $x_{b2}$ . . . $x_{bN}$ and $y_{a1}$, $y_{a2}$, $y_{a3}$ . . . $y_{aN}$ of the stepping switches X and Y, respectively. The connection system is in this figure so indicated that, as in the previous case, the reference characters of the contacts or brushes of the switch $K_2$ correspond to the reference characters of the contacts to which they are to be connected and differ only by an added dash to each reference character.

Thus, if the embodiment according to FIG. 12 works as a comparing unit for $r$, the lower control limit, diminished by one $(R_{rL}-1)$ is set on one of the multipole multicontact switches, e.g., the switch $K_1$, and on the other switch $K_2$ the upper control limit, increased by one, $(R_{rU}+1)$, is adjusted. These switches are equipped with knobs (not shown) and the setting can be done by hand. In case of statistical control based on "moving" characteristics, the changing of the control limits is done automatically as long as the number of measurements is less than the sampling number $n$.

The same device as shown in FIG. 12 can also be used for comparing the sample characteristics S' or S— according to the Equations 12' or 2—with their statistical control limits $R_{S'}$ or $R_S$ respectively. In this case there is of course, only one limit which can be exceeded, so that one contact series on each of the switches X and Y connected by a single multiple-multicontact switch is sufficient.

When using the characteristic S' and the memory units of FIG. 10, the impulses $u$ are led to the electromagnets $X_E$ and $Y_E$, namely the impulse of $k$th memory unit $M_k$ as the impulse $x$ and the impulse from the $(k-n)$th memory unit $M_{k-n}$ as the impulse $y$ (compare Expression 12''). The multipole multicontact switch $K_1$ is then rotated in counterclockwise direction "—" since the device is intended to indicate whether $$S'=g<R_{S'} \qquad (12a)$$

If the characteristic S would be used, the impulse $t$ and $v$ from the memory unit $M_k$ would be used as the impulse $x$, and the impulses $t$ and $v$ from the memory unit $M_{k-n}$ as the impulse $y$ (compare Expression 16). Then, of course, the multipole multicontact switch $K_1$ would have to be set in the direction (+) as the indication would have to follow the relation $$S=z_{+}+z_{-}>R_S \qquad (2a)$$

It has yet to be noted that the number of contacts in all stepping switches must correspond to each other and must be larger than the sampling number or at least equal to it; that is, $$n \leqq N$$

Also the values of the control limits $R_{rU}$, $R_{rL}$ must be within certain limits when using the multipole multicontact switches $K_1$ and $K_2$. They must be less than half the number N, as otherwise an exchange between the upper and lower limits could take place. This demand is of course always fulfilled in practice.

It may be added that instead of the switches $K_1$ and $K_2$ any other means may be used to connect the respective contacts of the stepping switch series, but the embodiment shown in FIG. 12 has been found highly satisfactory.

The block $P_M$ in FIGS. 1, 2, 3, 6, 7, 7a may comprise any production machinery, which depends upon the nature of the quality characteristic that is to be controlled. If the quality characteristic is weight, as is the case of most of the arrangements of the prior art, the block $P_M$ may comprise, for example, a molding unit such as the unit 50 of FIG. 1 of U.S. Patent No. 2,664,557 to Sargrove. If a dimension is controlled, the production machine may be a centerless grinding machine as mentioned. Any suitable grinding machine known in the art may be utilized. The block $G_A$ represents gauging apparatus in all the block diagrams.

In the block diagram of FIG. 6 the block of $G_A$ may be represented either by the element denoted by the reference letters $C_n$, $C_g$, $C_z$ and $S_T$ of FIG. 7 or by the elements $C_n$ and $G_{A'}$ of FIG. 7*a*. For the alternative of FIG. 7, the blocks D, $S_S$ and F are shown in FIG. 9 in more detail. The block M of FIG. 7 consists of a number of memory units $M_1$, $M_2$ . . . $M_N$, each of which is shown in the embodiment of FIG. 8. The block E of FIG. 6 comprises evaluating units of the type described, such as, for example, shown in U.S. Patent No. 2,688,441. The block E of FIG. 6 may be considered to comprise the control limit adjusting unit $R_{S'}$ which may comprise a potentiometer of known type and the evaluating unit $E_{S'}$ (as shown in FIG. 7). The unit $E_{S'}$ may comprise a thyratron, the grid voltage of which is controlled by the potentiometer of the unit $R_{S'}$. The potentiometer setting depends upon the number of articles measured; after this number $x$ has reached the sample batch number $n$ the grid voltage is kept constant and corresponds to the control element $R_{S'}$. The thyratron unit $E_{S'}$ is fired when the sum of the active resistances $R_6$ of all the memory units of FIG. 8, connected in series, is less than the thus predetermined limit. The firing of the thyratron results in flashing of the lamp $S_B$. It is evident from the foregoing that the $S_B$ is flashed when there are less resistances $R_6$ in circuit; that is, the voltage across the terminals of $E_{S'}$ is higher than the limiting voltage. On the other hand, the block E of FIG. 6 also contains an evaluating unit $E_{r'}$ and control adjusting unit $R_{r'U}$ and $R_{r'L}$ (shown in FIG. 7). The unit $E_{r'}$ may comprise, analogously to $E_{s'}$, two thyratrons, one firing at an upper and one at a lower limit current of the circuit $e_{r'}$ of all memory units connected in series. Each of the control adjusting units, which may be in the form of potentiometers connected to the grids of the thyratrons, controls the firing voltage of one thyratron which, when fired, activates one of the lamps $S_B{}^+$ and $S_B{}^-$. On the other hand, if the gauging device is represented by a counter $C_n$ and gauge $G_A'$ of the type identified in the present disclosure, the memory units must be of the type shown in FIG. 10. The blocks D, $S_s$ and F are shown in detail in FIG. 9A. An additional three contact sets and relays $R_D$ and $R_F$ must be utilized. The operation of the arrangement of FIG. 9A is described in the present disclosure.

The block $G_A$ of the block diagrams of FIGS. 1, 2 and 3 may contain any suitable gauging device capable of sorting out the measurements taken into three groups. A suitable gauging device may comprise that identified in the present disclosure, a sorting device of the type illustrated in FIG. 2 of U.S. Patent No. 2,713,408 to Weber, or the device $S_r$ of FIG. 7. The block $S_E$ of FIG. 2 may comprise the arrangement of FIG. 5. This is the preferred embodiment, and in this case, $G_A$ is the gauging device identified in the present disclosure. As an alternative, the block $S_E$ of FIG. 2 may contain several conventional telephone stepping switches, such as, for example, those illustrated in FIG. 9, or in FIGS. 4 and 5. The block $C_r$ may for example be represented by the comparing unit of FIG. 12, where the line + is connected to the input $x$ and the line − is connected to the input $y$. The same comparing unit of FIG. 12 may be utilized as the block $C_s$, but both lines + and − would be connected to the same input terminal $x$. Only one switch $K_1$ would be used and the lamp $S_B$ would flash if the sum S reaches a predetermined number $R_s$. Simple provision could be made to keep this lamp ON even if this number is exceeded. This may be achieved by a second switch $C_{bz}$ which keeps the relay $R_b$ connected to the battery $B_x$. The blocks $C_{z+}$ and $C_{z-}$ are counters, simple step switches which may be dispensed with if their information is not needed. The counter $C_n$ is utilized to provide information that the sample batch number has been reached. Corresponding blocks of FIGS. 1, 2 and 6 are the same.

FIG. 3 is the same as FIG. 1 with the exception that FIG. 3 includes automatic production control. Impulses from the unit $S_E$ of FIG. 3 (supplied to the signalling means $S_M$, in FIG. 1) are utilized to energize the blocks $C_{D+}$ and $C_{D-}$, respectively. The blocks $C_{D+}$ and $C_{D-}$ may each comprise a relay energized by said impulses to switch in a reversible correcting motor. The blocks $C_{D+}$ and $C_{D-}$ of FIG. 3 correspond to the "high" control units 70 and "low" control unit 71 of U.S. Patent No. 2,664,557 to Sargrove. The block $C_M$ corresponds to the reset unit 72 of U.S. Patent No. 2,664,557 to Sargrove. The block $R_A$ may comprise any suitable registering apparatus known in the art, such as, for example, a drum driven by a clock mechanism. Printers actuated by the impulses from the unit $S_E$ mark the recording medium of the registering apparatus and record the measured values of the quality characteristic under consideration. The arrow marked STOP indicates a means for utilizing the impulse which energizes the signal light $S_B''$ to stop production by stopping the production machinery.

The above disclosure serves only for the explanation of the principle of the present invention, it being understood that any apparatus using similar impulses for signaling or control purposes on the basis of a statistical grouping method lies within the scope of the present invention, it being further obvious that many combinations of the statistical evaluation apparatus with gauging, signaling and registering means may be carried out without departing from the scope of the present invention.

I claim:

1. An evaluation system for a statistical quality control of a measurable physical quality characteristic in articles produced by producing means operating in connection with gaging means for consecutively checking in a predetermined number of articles for each control action a measurable physical quality characteristic measured in relation to a selected number of predetermined Modified Production Capability limits to determine from said predetermined number of articles a plurality of groups, said gaging means producing electrical signals indicative of the group into which each article is classified, said evaluation system comprising, means for successively receiving from said gaging means electrical signals related to articles of the predetermined number indicative of the group into which each article is classified;

means for storing information provided by said electrical signals for each control action including means for accumulating statistical sample characteristics consisting of arithmetic combinations, said statistical sample characteristics providing information about the variation of the position of the mean and of the dispersion of the statistical distribution of said quality characteristic in said predetermined number of articles; and means for providing control signals indicating if said statistical sample characteristics consisting of arithmetic combinations exceed selected statistically predetermined control limits indicative of inadmissible variation of the position of the mean and of the dispersion of the statistical distribution of said quality characteristic in said predetermined number of articles.

2. An evaluation system for a statistical quality control of a measurable physical quality characteristic in articles produced by producing means operating in connection with gaging means for consecutively checking in a predetermined number of articles for each control action a measurable physical quality characteristic measured in relation to two predetermined Modified Production Capability limits to determine from said predetermined number of articles three groups, said gaging means producing electrical signals indicative of the group into which each article is classified, said evaluation system comprising, means for successively receiving from said gaging means electrical signals related to articles of the predetermined number indicative of the group into which each article is classified;

means for storing the information provided by said electrical signals for each control action including means for accumulating statistical sample characteristics consisting of arithmetic combinations, said statistical sample characteristics providing information about the variation of the position of the mean and of the dispersion of the statistical distribution of said quality characteristic in said predetermined number of articles; and means for providing control signals indicating if said statistical sample characteristics consisting of arithmetic combinations exceed selected statistically predetermined control limits indicative of inadmissible variation of the position of the mean and of the dispersion of the statistical distribution of said quality charactertistic in said predetermined number of articles.

References Cited in the file of this patent

UNITED STATES PATENTS

| | | |
|---|---|---|
| 2,664,557 | Sargrove | Dec. 29, 1953 |
| 2,688,441 | Merrill et al. | Sept. 7, 1954 |
| 2,688,459 | Merrill et al. | Sept. 7, 1954 |
| 2,712,408 | Weber | July 5, 1955 |
| 2,767,914 | Merrill et al. | Oct. 23, 1956 |
| 2,768,784 | Gordon et al. | Oct. 30, 1956 |
| 2,785,856 | Hobbs | Mar. 19, 1957 |
| 2,852,189 | Becker | Sept. 16, 1958 |
| 2,877,895 | Drader | Mar. 17, 1959 |
| 2,893,635 | Gitzendanner | July 7, 1959 |
| 2,897,638 | Maher | Aug. 4, 1959 |
| 2,934,272 | Ayers et al. | Apr. 26, 1960 |